US012135395B2

(12) United States Patent
    Alismail

(10) Patent No.:     US 12,135,395 B2
(45) Date of Patent:     Nov. 5, 2024

(54) MULTI-BEAM LIDAR INTENSITY CALIBRATION BY INTERPOLATING LEARNED RESPONSE CURVE

(71) Applicant: Aurora Operations, Inc., Pittsburgh, PA (US)

(72) Inventor: Hatem Alismail, Pittsburgh, PA (US)

(73) Assignee: Aurora Operations, Inc., Pittsburgh, PA (US)

( * ) Notice: Subject to any disclaimer, the term of this patent is extended or adjusted under 35 U.S.C. 154(b) by 996 days.

(21) Appl. No.: 17/247,497

(22) Filed: Dec. 14, 2020

(65) Prior Publication Data

US 2021/0181319 A1     Jun. 17, 2021

Related U.S. Application Data

(60) Provisional application No. 63/018,447, filed on Apr. 30, 2020, provisional application No. 62/947,253, filed on Dec. 12, 2019.

(51) Int. Cl.
    *G01S 7/497*     (2006.01)
    *G01S 7/481*     (2006.01)
    *G01S 17/931*    (2020.01)

(52) U.S. Cl.
    CPC ............ *G01S 7/497* (2013.01); *G01S 7/4817* (2013.01); *G01S 17/931* (2020.01)

(58) Field of Classification Search
    None
    See application file for complete search history.

(56) References Cited

U.S. PATENT DOCUMENTS

| 2013/0049641 | A1* | 2/2013 | Sheynblat | G01S 7/497 |
| | | | | 250/221 |
| 2014/0152971 | A1* | 6/2014 | James | G01S 7/497 |
| | | | | 356/4.01 |

(Continued)

OTHER PUBLICATIONS

Kashani, Alireza G., "A review of LiDAR radiometric processing: From ad hoc intensity correction to rigorous radiometric calibration", Sensors 15.11, (2015), 28099-28128.

(Continued)

*Primary Examiner* — Eric L Bolda
(74) *Attorney, Agent, or Firm* — Schwegman Lundberg & Woessner, P.A.

(57) ABSTRACT

Lidar intensity calibration from multi-beam lidar sensors uses calibration panels with known reflectance. The intensity response curves of each lidar beam are learned and modeled as a function of the known reflectivity, the transmission power level, and the distance. Contrary to the lidar equation, characterization of multi-beam lidar scanners commonly used for autonomous driving applications reveals that intensity does not fall-off according to the theoretically expected inverse distance-squared. Instead, a maximum intensity response is attained at a specific distance (focal distance). While the focal distance varies across beams, it is independent of the transmission power. Outside of the focal distance, distance intensity exhibits a sharp fall off. The intensity response curve of the lidar is well-approximated by a parametric form. Learned splines as functions of distance and power level determine the most likely mapping from raw data to surface reflectance along with a measure of uncertainty.

19 Claims, 31 Drawing Sheets

(56) References Cited

U.S. PATENT DOCUMENTS

| | | | | |
|---|---|---|---|---|
| 2015/0144767 | A1* | 5/2015 | Drader | G01S 17/04 |
| | | | | 250/206.1 |
| 2017/0124781 | A1* | 5/2017 | Douillard | G08G 1/207 |
| 2017/0328992 | A1* | 11/2017 | Baik | G01S 7/4972 |
| 2019/0011542 | A1* | 1/2019 | Shi | G01S 17/89 |
| 2019/0339361 | A1* | 11/2019 | Fechner | G01S 13/931 |

OTHER PUBLICATIONS

Levinson, Jesse, "Unsupervised calibration for multi-beam lasers", Experimental Robotics. Springer, Berlin, Heidelberg, (2014), 8 pgs.

* cited by examiner

MULTI-BEAM LIDAR INTENSITY CALIBRATION BY INTERPOLATING LEARNED RESPONSE CURVE

CROSS-REFERENCE TO RELATED APPLICATIONS

The present application claims priority to U.S. Provisional Patent Application Ser. No. 62/947,253, filed Dec. 12, 2019 and to U.S. Provisional Patent Application Ser. No. 63/018,447, filed Apr. 30, 2020. The contents of both provisional patent applications are hereby incorporated by reference.

TECHNICAL FIELD

This document pertains generally, but not by way of limitation, to devices, systems, and methods for calibrating lidar intensity from multi-beam lidar sensors using calibration panels with known reflectance.

BACKGROUND

Multi-beam lidars, such as the Velodyne HDL-64e, have been popular active sensors for autonomous driving. In addition to providing reliable range measurements at a relatively high frequency, lidar reports the strength of each return in the form of intensity quantized to a single byte.

The correlation between intensity and the reflectivity of materials provides a valuable signal for different applications such as scene classification and structural inspection, among others. More recently, lidar intensity was shown to provide useful information for autonomous vehicles' localization and mapping tasks. Using lidar intensity information in a localization system provides additional constraints required to estimate the six-degrees-of-freedom pose of the vehicle in environments where geometry-only methods typically fail. Such situations include, but are not limited to highways and tunnels, where the geometry consists of one or more predominant planes.

However, to effectively use intensity for localization and mapping and other tasks, the signal must be calibrated to a known standard. Prior work has outlined the importance of a calibrated-signal for this purpose, and various approaches have been proposed to improve the accuracy and repeatability of lidar intensity data. Nonetheless, prior work remains limited to either a single sensor that does not provide a solution that could be transferable across different sensing units and hence is not a calibration per se or limited to high-end lidar terrestrial and airborne lidar units which are inapplicable to autonomous driving tasks.

Lidar and lidar intensity) has been well-studied in research areas other than autonomous driving. Namely, Kashni, et al., in "A Review of LIDAR Radiometric Processing: From Ad Hoc Intensity Correction to Rigorous Radiometric Calibration," Sensors, Vo. 15(11), 28099-28128 (2015), provide a comprehensive review and classification of different lidar calibration procedures using high-quality remote sensing lidar. Kashni et al. describe rigorous radiometric correction and calibration. Kashni et al. also provide a review of different calibration algorithms but do not describe automated detection of the calibration on a single target, modeling the response function using a parametric form not motivated by the lidar-equation, or an interpolation procedure used to obtain precise reflectance estimates.

Research in intensity calibration for lidar in the industry is limited. One notable work is the non-parametric correction procedure described by Levinson et al. in "Unsupervised Calibration for Multi-beam Lasers," Experimental Robotics, Springer Tracts in Advanced Robotics, vol. 79, Springer, Berlin, Heidelberg, pp. 179-193 (2014). Levinson et al. make use of several measurements on the ground surface to obtain a correction factor that aims at minimizing the discrepancy of intensity returns collected from a small area on the ground. However, Levinson et al, require a precise localization system that is not suitable for sensor characterization offline. More importantly, the approach used by Levinson et al. is not strictly a calibration as there are no guarantees that different lidar units will produce the same calibration measurement. However, Levinson et al. do correctly point out the shortcomings of factory-calibrated Velodyne units.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIGS. 6A-6J illustrate example results of the calibrated data where the top images (FIGS. 6A, 6C, 6E, 6G, and 6I) illustrate the results using a state-of-the-art current intensity calibration procedure, while the bottom images (FIGS. 6B, 6D, 6F, 6H, and 6J) illustrate the results using the disclosed calibration procedure.

DESCRIPTION

Figure 1:
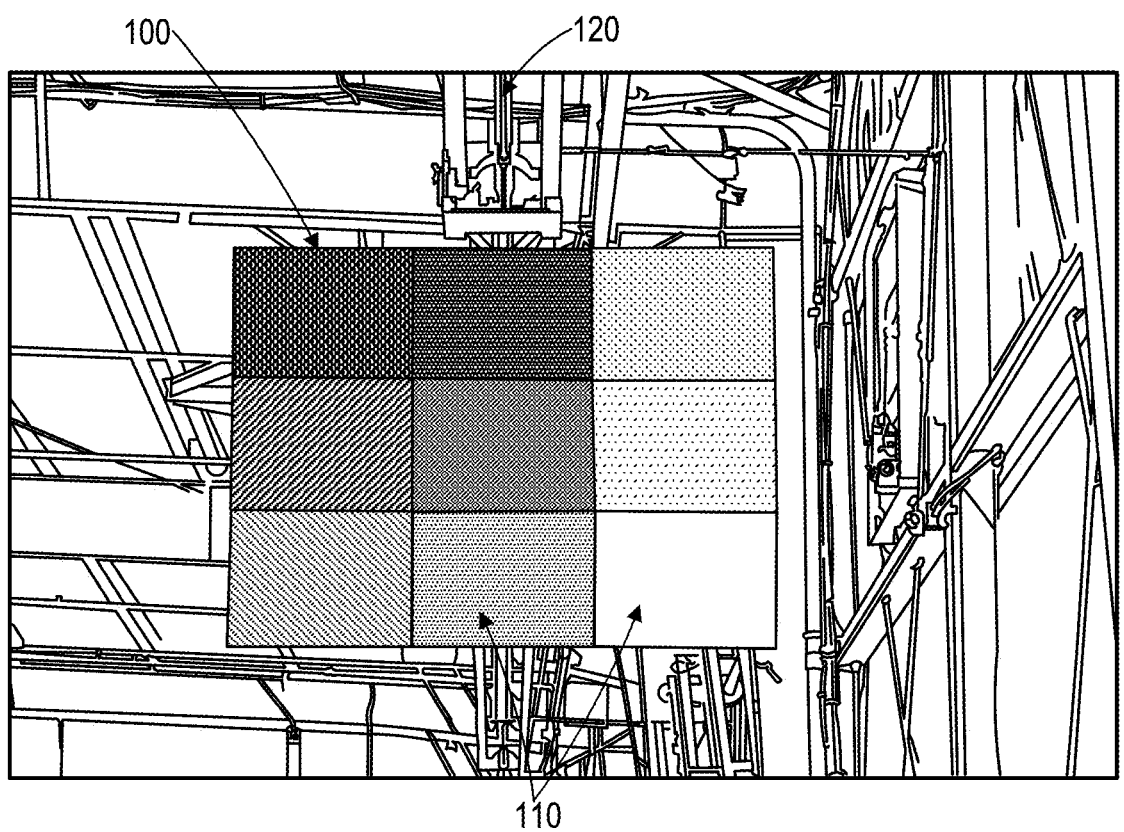
FIG. 1 illustrates a calibration target in a sample embodiment.

Reference now will be made in detail to embodiments, one or more example(s) of which are illustrated in the drawings. Each example is provided by way of explanation of the embodiments, not limitation of the present disclosure. It will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure as described with respect to FIGS. 1-7 cover such modifications and variations.

For at least the reasons described above, it is desired to improve the accuracy and consistency of Lidar intensity calibration, particularly for localization tasks. Embodiments will be described that produce calibration with respect to surface reflectance and assess performance across different lidar manufacturers. The disclosed embodiments also reduce data collection time whereby data collection to calibration may be achieved in under an hour. The disclosed embodiments also reduce storage requirements and the computation requirements on a vehicle.

The goal of lidar intensity calibration is to determine a mapping from the raw intensity, lidar power, and distance to a reflectance value. The calibrated reflectance value should be consistent not only across the different beams for a given unit but also should be uniform across different lidar units. To this end, the calibration procedure described herein includes a novel data collection apparatus and a novel algorithm for calibrating the lidar.

In a sample embodiment, the data collection apparatus includes a calibration target design including a rigid board made of 9 rectangular panels of known reflectance values (e.g., reflectivity from 3% to 85%) organized in a grid and mounted on an apparatus where the target can be adjusted (slid) along a linear rail to place the target at various distances from the lidar to thereby form a linear range. The panels are arranged in a 3×3 grid to reduce space requirements. Each panel is 0.66 m in width and 0.5 m in height. The calibrated target is mounted on a linear rail covering a sampling range up to 40 m. The lidar is mounted on an actuating platform (a gimbal) to ensure that each beam can sample each of the calibration panels. The gimbal sweeps all beams across the target to ensure sufficient measurements from every lidar beam to every calibration panel. The range of gimbal motions and target scanning time are optimized given the beam angles and distance to the target. For example, the procedure for automated target extraction and panel assignment includes processing means designed to optimize the nodding angle range and the target scanning time as a function of the calibration target's distance to the lidar.

The algorithm for calibrating the lidar calibrates different types of lidar units across all feasible power levels and describes the response curve of the lidar per power level in parameter form. The calibrated reflectance value is obtained as the reflectance value associated with the response curve that minimizes the absolute deviation between the raw lidar measurements and their learned response curve. To obtain a precise reflectance calibration from the discrete set of 9 panels, the optimum reflectance is obtained by the processing means interpolating a parabola parameterized by reflectance in the vicinity of or at the reflectance value defining the minimum. The framework of determining the optimal reflectance value by interpolating the reflectance value associated with each curve that minimizes the deviation between the raw measurements and their parametric form is generic and is applicable to different parametric forms of the response function.

In sample embodiments, an algorithm for lidar intensity calibration from multi-beam lidar sensors (e.g., Velodyne HDL-64e) uses calibration panels with known reflectance. The problem is formulated by learning the intensity response curves of each lidar beam, which are modeled as a function of the known reflectivity, the transmission power level, and the range. Contrary to the lidar equation, the characterization of the multi-beam lidar scanners commonly used for autonomous driving applications reveals that intensity does not fall-off according to the theoretically expected inverse range-squared. Instead, a maximum intensity response is attained at a specific range (focal distance). While the focal distance varies across beams, it is independent of the transmission power, which leads to the conclusion that this behavior is potentially intrinsic to the manufacturing processes of the sensor. Outside of the focal distance range intensity exhibits a sharp fall off. The intensity response curve of the lidar can be shown to be well-approximated by a parametric form such as a quadratic B-Spline with a small number of control points. Use of the learned splines as functions of range and power level may be demonstrated to determine the most likely mapping from raw data to surface reflectance along with a measure of uncertainty. Such an approach is shown to be accurate and repeatable when employed on multiple lidar units.

In the following description, a full characterization of the response curve for an instance of multi-beam lidars commonly used for autonomous driving is provided for the Velodyne HDL-64e. It will be appreciated that the Velodyne HDL-64e is used as merely an illustrative example. Interestingly, it may be demonstrated that the Velodyne HDL-64e intensity response curve does not conform to the theoretical lidar equation dictating a signal fall-off at a rate inversely proportional to the range squared. Instead, each beam has a specific range where intensity attains a maximum. Outside of this range, intensity exhibits sharp fall-off. Fortunately, the intensity response curves are well-approximated by a parametric form. The form of the intensity response curve is shown to be well-approximated by the shape of a log-power law distribution, which is a function of only three parameters: the location of the maxima, the scale of the measurements, and the curve's constant.

Approach

The calibration problem is approached by learning the intensity response curve per lidar beam by observing ground truth reflectance standards at multiple distances. The response curve per beam is defined as a function of the directly observable variables of the lidar return data, namely, the estimated range and the transmission power. It is noted that lidar units do not typically report the transmission power in watts, so in practice, the response curve is a function of range and a power level. For the Velodyne sensor, the power level is discretized to 8 levels, where 0 is the lowest and 7 is the highest.

Calibration Target

To measure the response curve of the lidar, a square target 100 composed of nine panels 110 of different reflectance standards covering the 0-100% range is used as shown in FIG. 1. To obtain a dense sampling over the operating distance, the target 100 is mounted on a linear rail 120 and the lidar is simultaneously nodded about the Y-axis by the nodding platform, thereby scanning the entirety of the calibration target 100. FIG. 1 illustrates a sample calibration target 100 that is composed of nine panels 110 each of size 0.66 m×0.5 m with reflectance values ranging from 3%-85% and that is mounted on a linear actuator covering a distance of 40 m. The list of reflectances used in the target 100 are (approximately): 3.0%, 6.5%, 11%, 20%, 37%, 44%, 50%, 64%, and 85%. This calibration target 100 was used in the examples described herein.

Multi-beam spacing produces scanning patterns with denser returns closer to the sensor and sparser returns farther from the sensor, which results in a nonuniform sampling of lidar data at different distances. This limitation is overcome by dynamically adjusting the speed for the linear range (and the nodding mechanism) ensuring a uniform and sufficient distribution of data.

Target Extraction

First, the nodding motion about the Y-axis is undone given the known Gimbal angle such that all data is in the same coordinate system. Next, a volume in space is predetermined to reduce the number of points that could belong to the target 100. Given all lidar points in the volume, only points that belong to a plane perpendicular to the lidar's Z-direction within a small tolerance are retained. Finally, a search is performed in space to find the most likely set of points that belong to the calibration target 100 as its 3D dimension is known. This search step attempts to maximize the number of 3D points within the known target dimension. The Nelder-Mead Simplex optimization algorithm may be used to find the best set of points within the known target dimension.

The Simplex algorithm's search step is required to account for non-orthogonal mounting deviations between the linear rail 120 and the lidar unit. The Simplex algorithm is initialized at (0, 0) for the first target. The output of the Simplex algorithm is used to initialize the search for subsequent targets for efficiency.

Data Collection

The data collection procedure is based on scanning the calibration depicted above at varying distances. In the sample calibration configuration of FIG. 1, the available distance range is up to 40 m, which is discretize into steps separated by one meter. In particular, the target 100 is moved along the linear rail 120 from 0 m to 40 m in increments of 1 m. For each increment of 1 m, the target 100 is held stationary to allow minimizing the effect of any motions as the target 100 hangs from the linear actuator. Each increment of 1 m is called a "target." For each target 100, an optimal nodding range of a gimbal unit of the nodding platform 130 is computed. This nodding range is determined from the lidar's intrinsic angles (more specifically the vertical beam orientation angles) and the distance to the target 100. This step is desired to ensure a sufficient set of data from each beam will be collected. For each target 100, the stationary scanning time is computed to ensure at least 50 sample measurements are obtained per lidar panel 110. The stationary waiting time is a function of distance.

Figure 2:
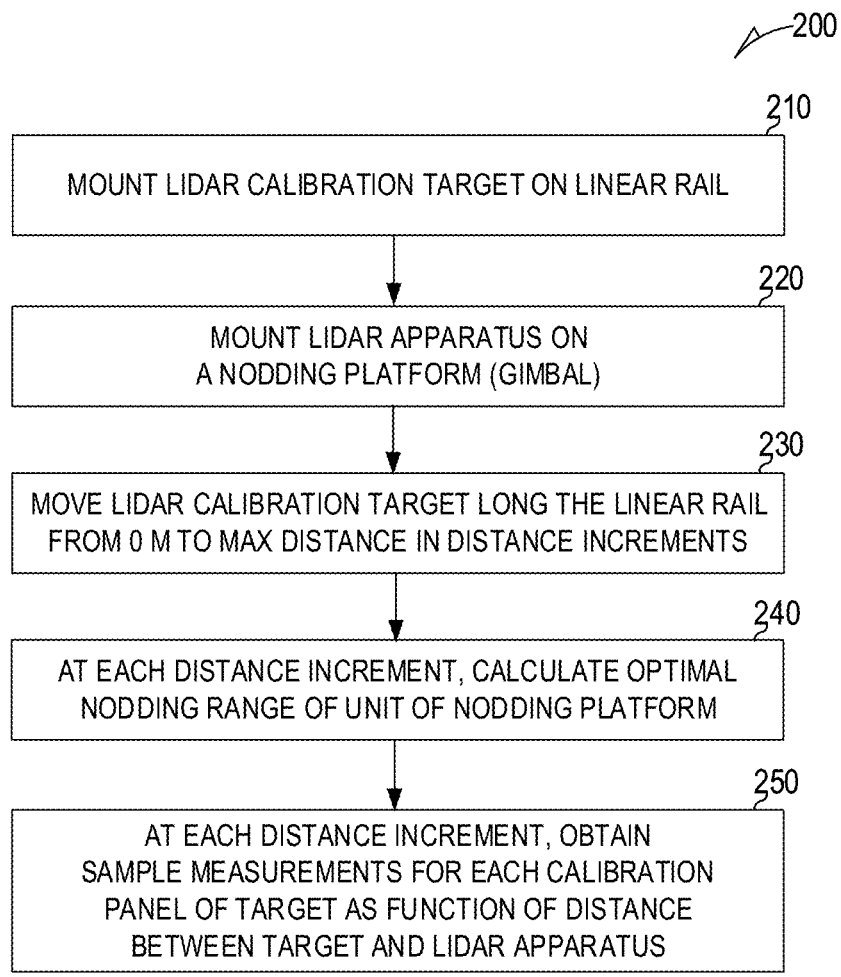
FIG. 2 illustrates a method of collecting lidar data in a sample embodiment.

FIG. 2 summarizes the method 200 of collecting lidar data in a sample embodiment. As illustrated, at 210, the lidar calibration target 100 comprising at least two calibration panels 110 having known reflectance values organized in a grid is mounted on linear rail 120. At 220, a lidar apparatus is mounted on a nodding platform (e.g., gimbal) configured to ensure that measurements may be taken for every lidar beam from the lidar apparatus to each of the at least two calibration panels 110. The lidar calibration target 100 is then moved at 230 along the linear rail 120 at a distance from 0 meter to a predetermined distance (e.g. 40 meters in predetermined distance increments. At each distance increment, an optimal nodding range of a unit of the nodding platform is calculated at 240. Finally, at each distance increment, a plurality of sample measurements per calibration panel 110 of the lidar calibration target 100 is obtained at 250 as function of distance between the lidar calibration target 100 and the lidar apparatus.

Given the known beam orientation for all beams and the range of motion of the nodding mechanism (the gimbal), a set of optimal gimbal angles is determined such that each beam can scan all calibration panels 110. For every scanning position, a wait period proportional to the distance from the lidar calibration target 100 to the lidar apparatus is provided to allow accumulation of a sufficient number of lidar returns per calibration panel 110. Increasing the wait time as a function of distance allows the system to make the data collection more efficient as, due to beam divergence, lidar returns on the calibration panel 110 are sparser for greater distances to the target 100.

The output of the target extraction step is the following data per beam:
  The estimated range of each reflectance standard within the operating distances;
  The lidar's power level; and
  The known reflectance standard.

Sample Embodiment of Data Collection Process

Ideally, it is desired to reconstruct the lidar response function continuously across the operating range. However, continuous scanning actuating the lidar introduces unnecessary complications for an automated target detection algorithm. It is desirable that the target detection be fully automated and resilient to some changes in the environment. The target detection must always be correct—the wrong data may not be associated with a target during calibration. The following is a recommended data collection procedure to achieve the following goals:
  Ensure sufficient and accurate sampling across the operating range;
  Simplify the automated target detection algorithm;
  Reduce the amount of logged data; and
  Reduce the data collection procedure runtime.

Initialization
  Set the power lidar mode to AUTO_CYCLE.
  Command the calibration target 100 to its Home position. The home position should not be less than 0.9 m (1.0 m is recommended).
  Command the gimbal to its home position. The Home position should be at the start/end of the sweep.

Data Collection
  Repeat the following steps until the maximum range is reached:
    Move the calibration target 100 to position HOME+delta.
    Wait until target 100 reaches position including settle downtime. The recommended wait time is 5 seconds or less if the rail acceleration is low enough not to cause jerks or wobbling.
    Log a timestamped position of the rail 120 (calibration board). The reported rail position would be used in the target extraction procedure to reduce the search space for the calibration board.
    Trigger lidar data collection. Log the timestamps of the data collection start and optionally only log lidar points whose range is within a specified tolerance from the rail's position. The tolerance depends on the gimbal angle range and the offset of the rail's origin from the lidar's origin.
    Perform two full sweeps of the lidar. Log the timestamped gimbal position in degrees. Optionally, more sweeps may be performed as the target 100 travels farther from the lidar.
    Stop lidar data collection.

The outputs from this process include the board distance from the origin as reported from its controller, timestamped lidar points, and timestamped gimbal positions.

Finalization
  At the end of the process, the data is offloaded and the calibration target 100 and gimbal are commanded to their home positions. The system is then powered down.

Qualitative Evaluation
  If only data is recorded that is within a specified tolerance from the rail's position, then:
    Set gimbal to an angle where most of the PGN is visible (no actuation).

Set the calibration target 100 to 20 m (upper block data on the road).
Collect 2 seconds of data on POWER_CYCLE.
Collect 2 seconds of data on AUTO.
Set the calibration target 100 to 8 m (lower block data on the road).
Collect 2 seconds of data on POWER_CYCLE.
Collect 2 seconds of data on AUTO.

The purpose of the qualitative evaluation is to produce a few screenshots of colorized point clouds with and without calibration. Another quantitative verification setup could be implemented using the stationary range, as desired.

Figure 3A:
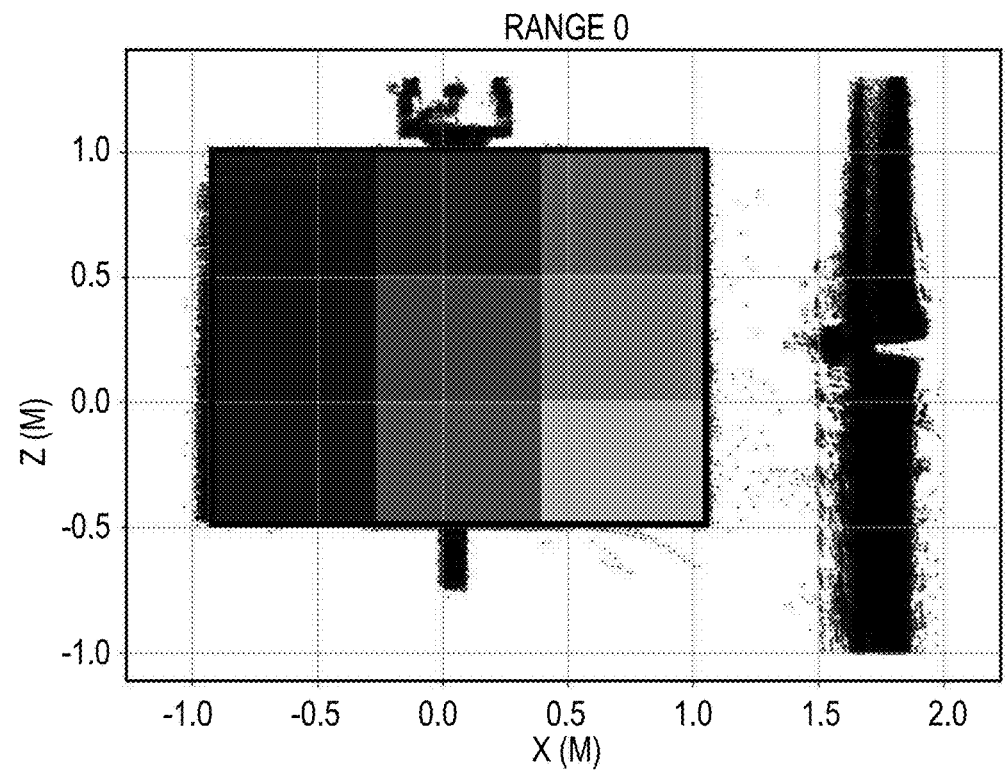
FIGS. 3A-3AJ illustrate sample detection for panels 0-35 representing ranges 0-35, respectively, where the panels are colorized by their ground truth reflectance percentage.
Figure 3B:
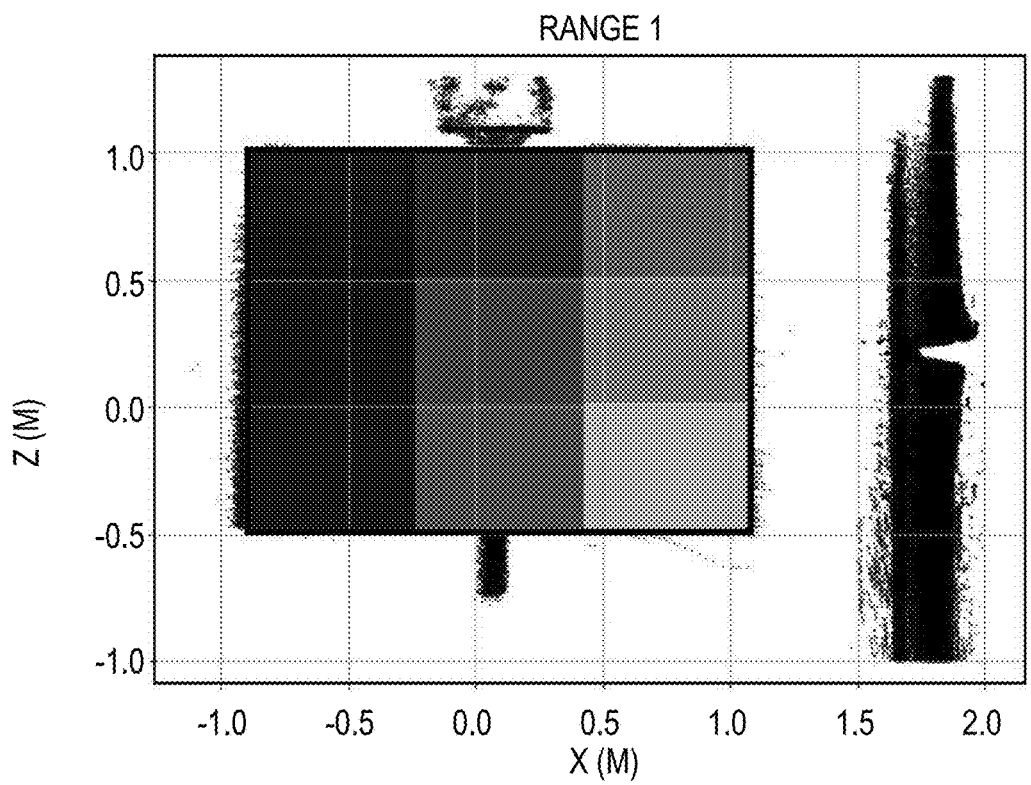
Figure 3C:
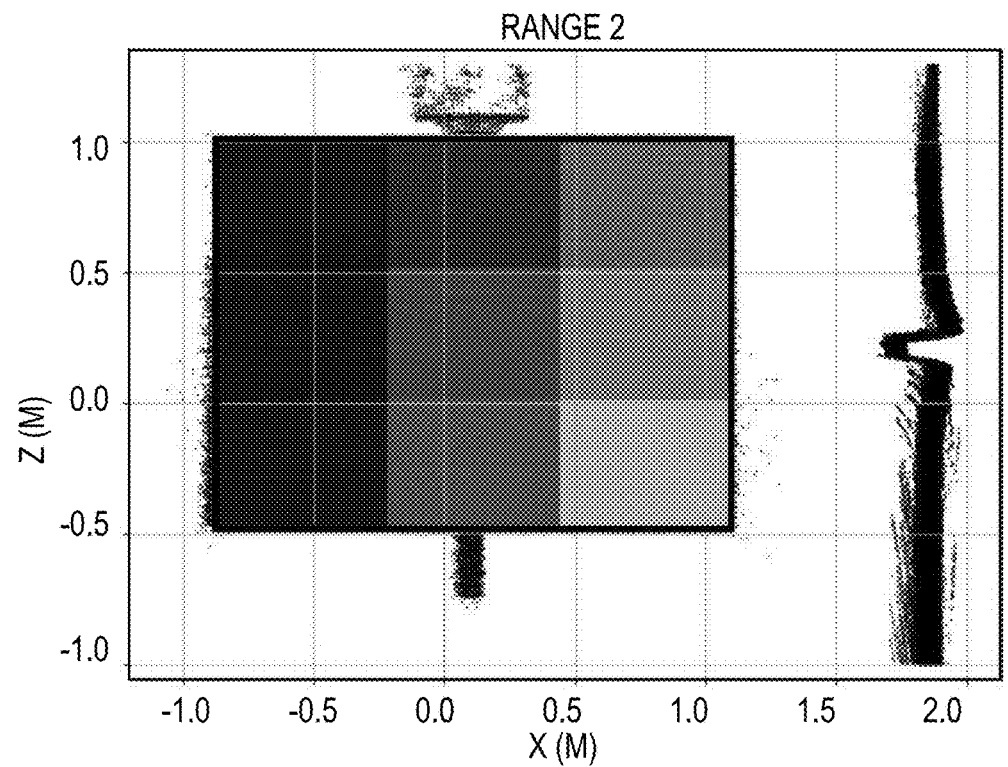
Figure 3D:
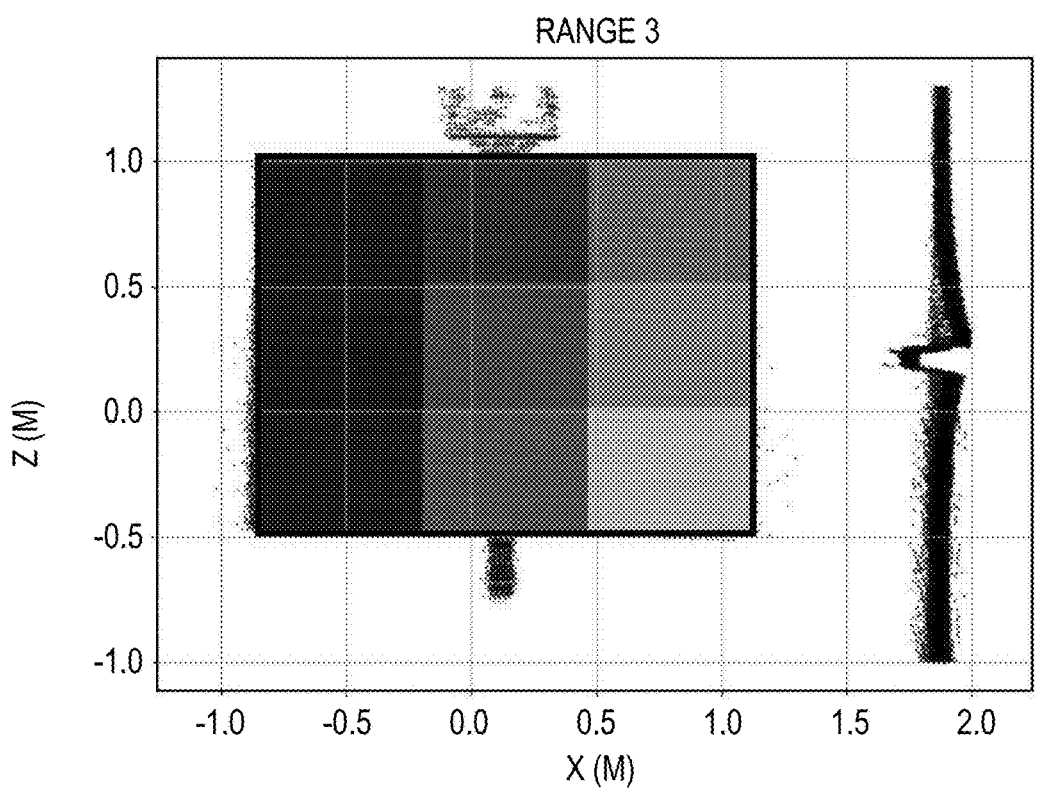
Figure 3E:
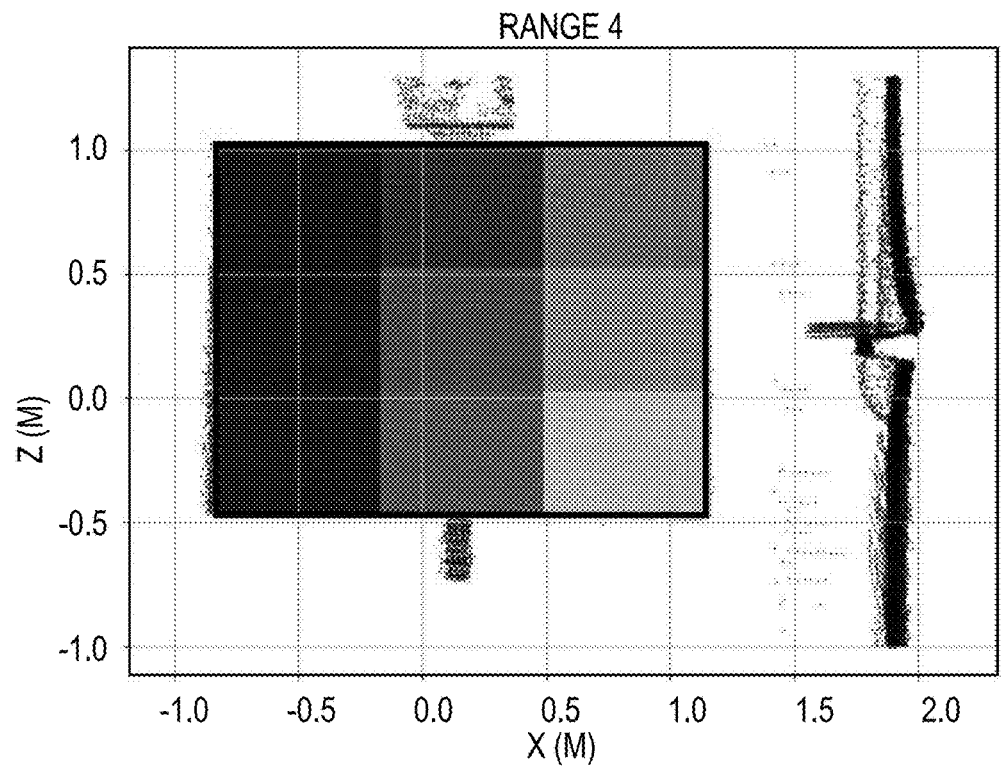
Figure 3F:
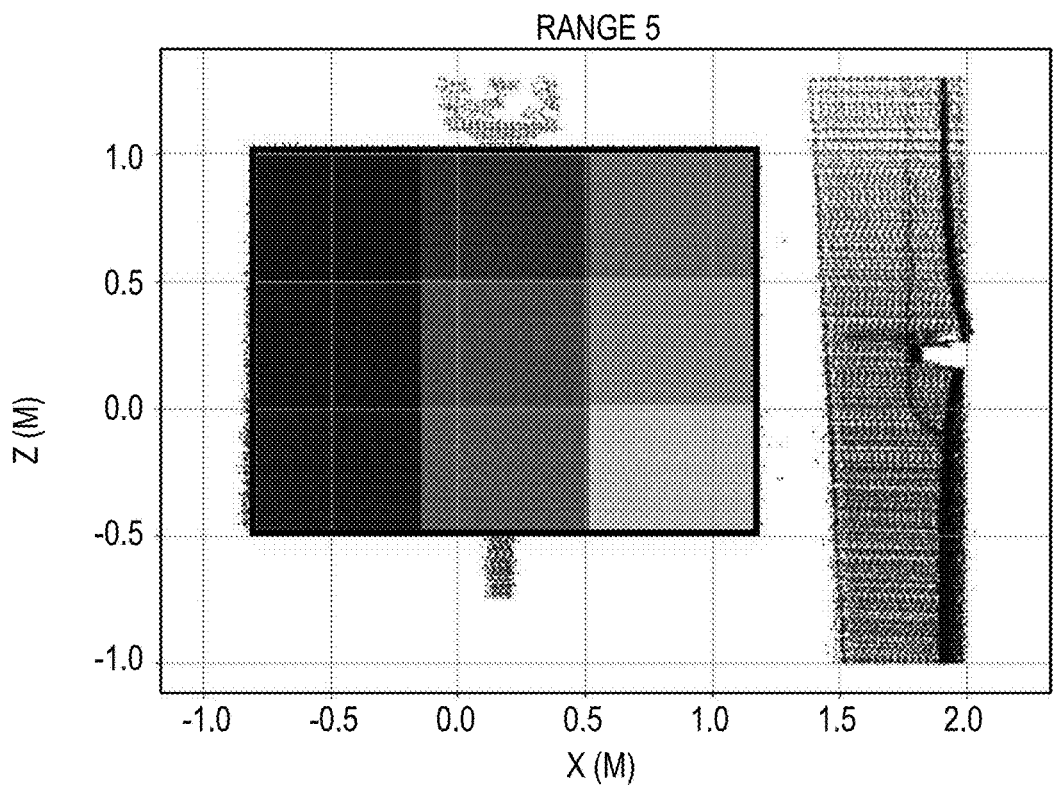
Figure 3G:
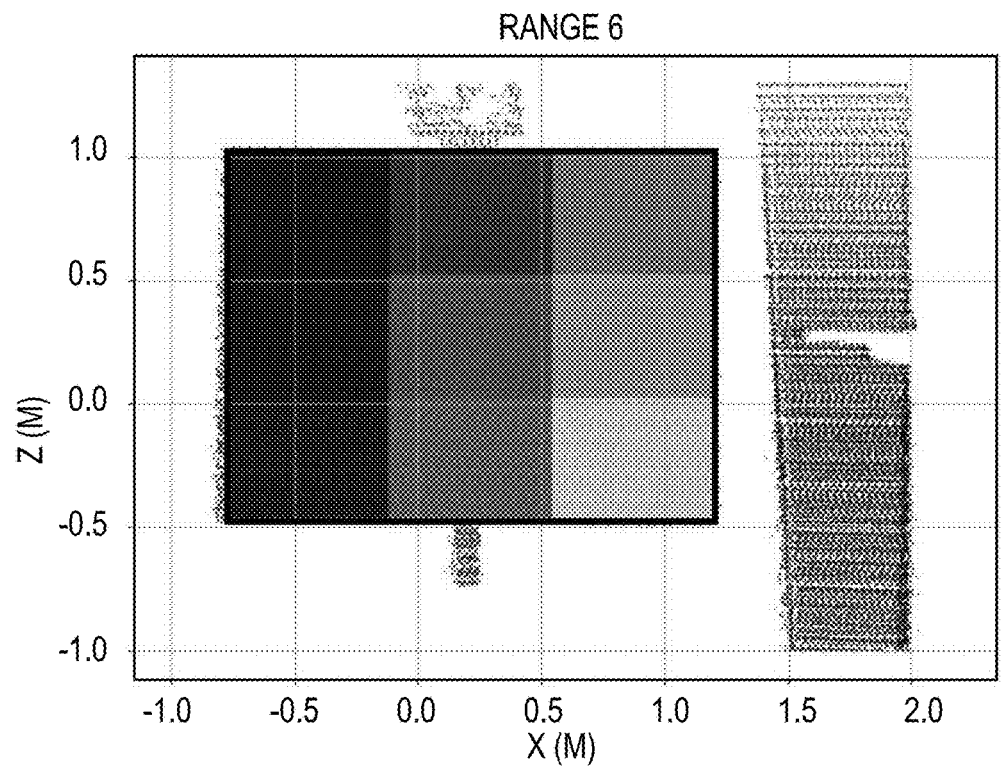
Figure 3H:
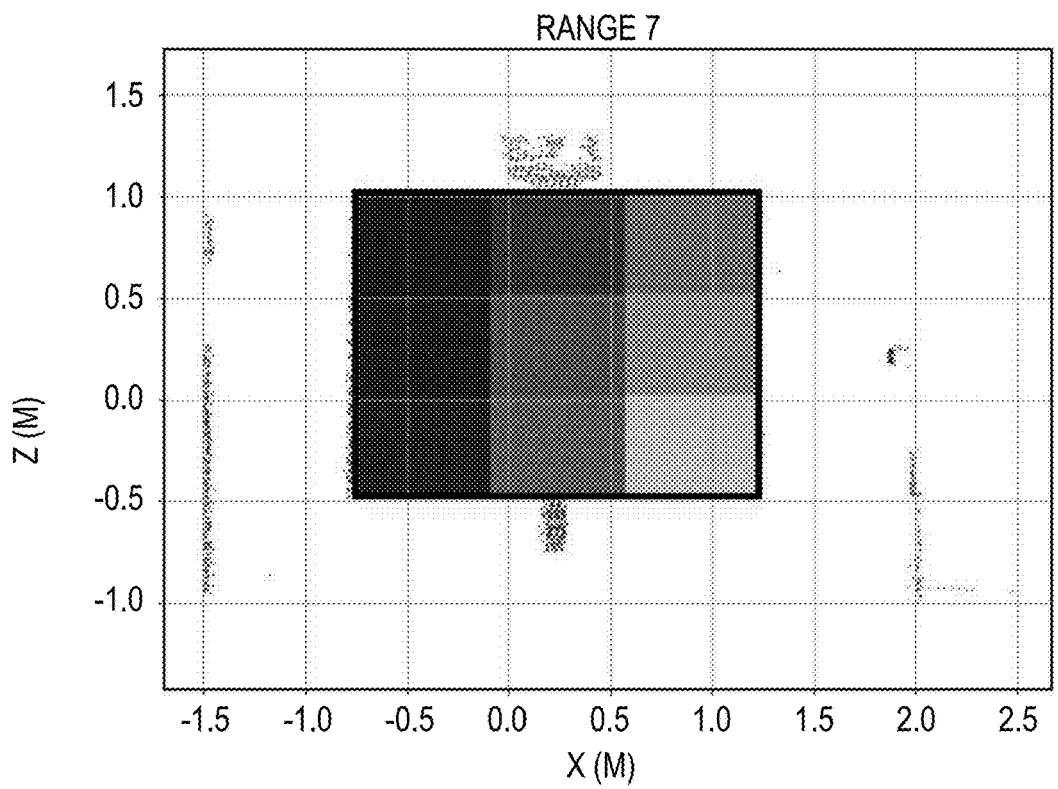
Figure 3I:
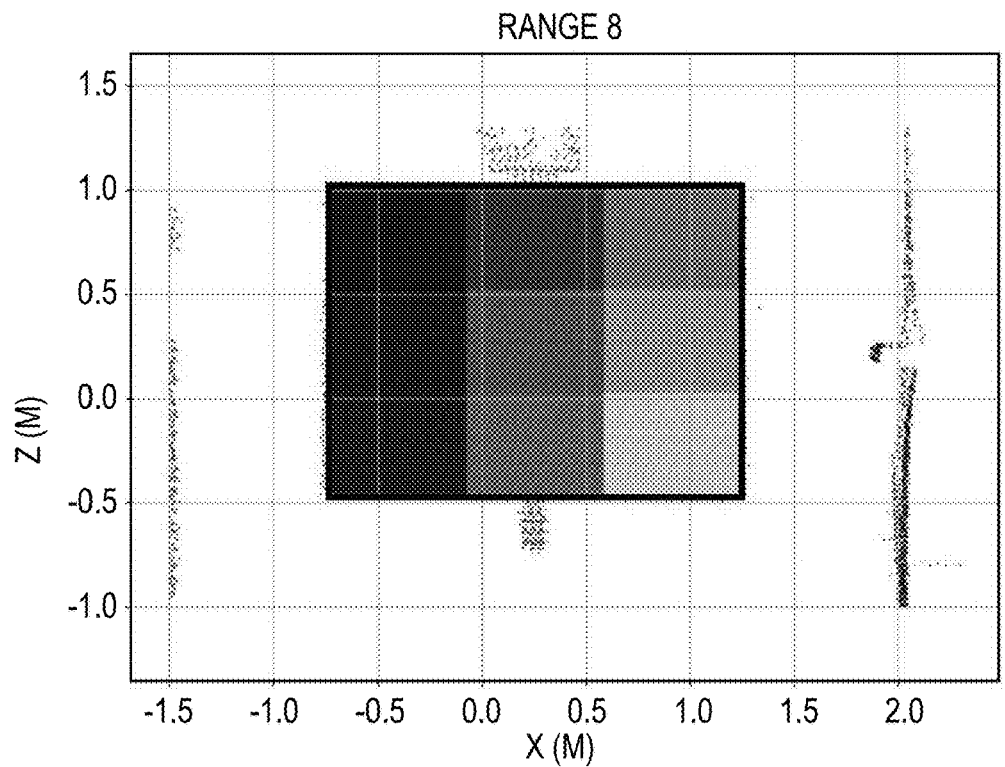
Figure 3J:
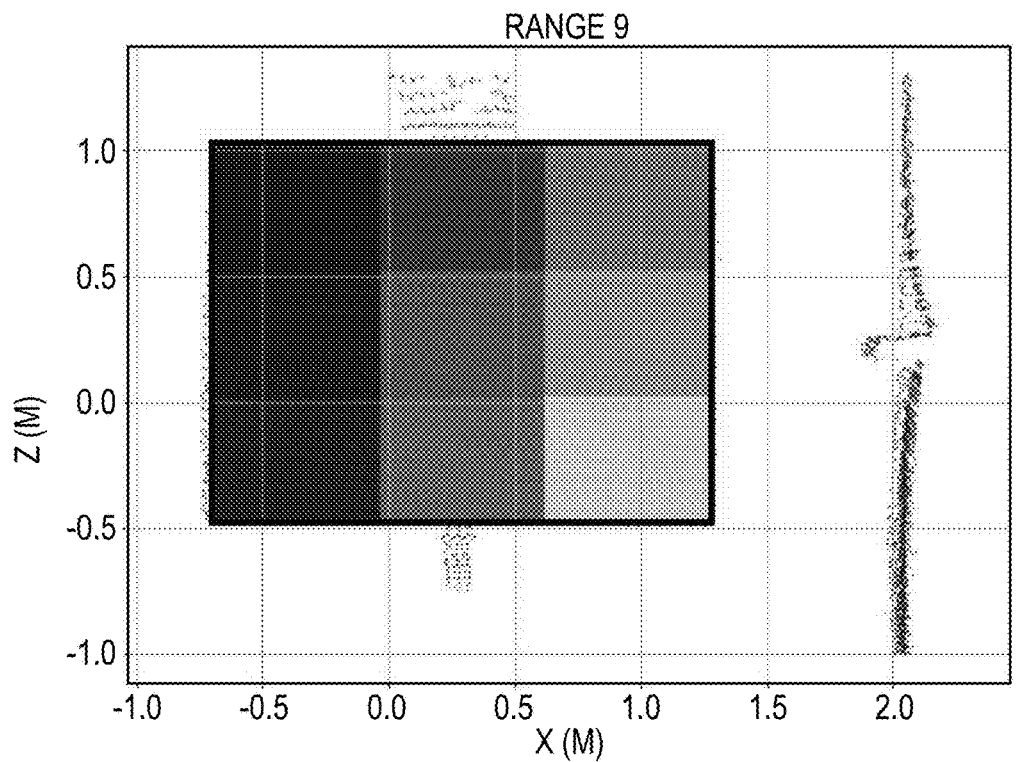
Figure 3K:
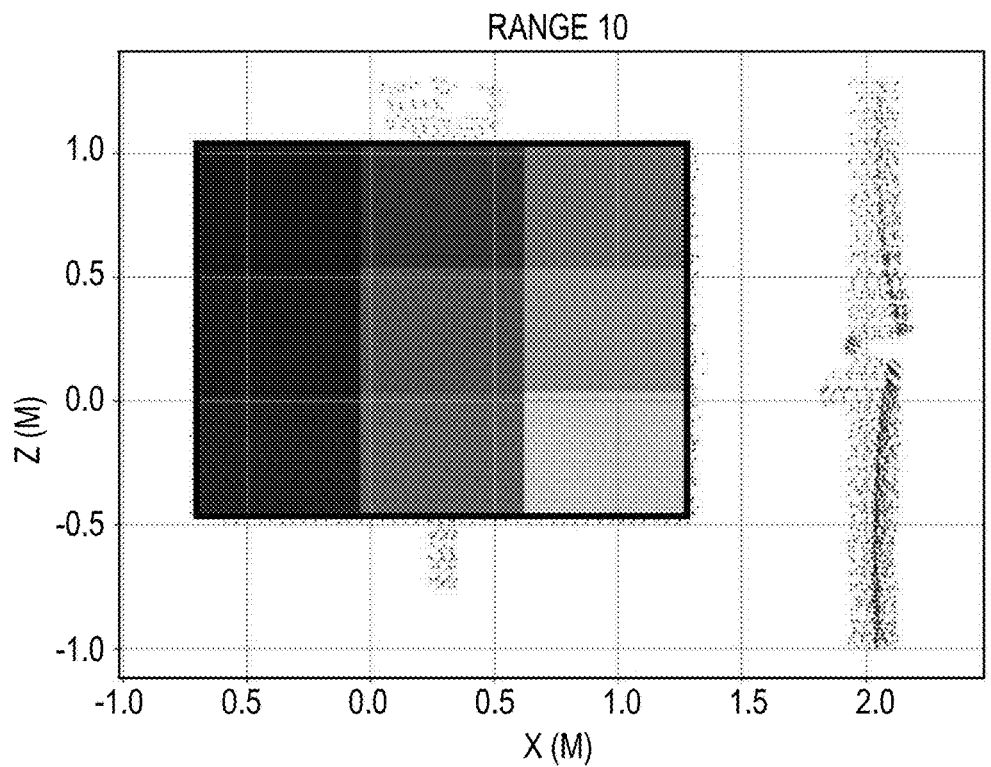
Figure 3L:
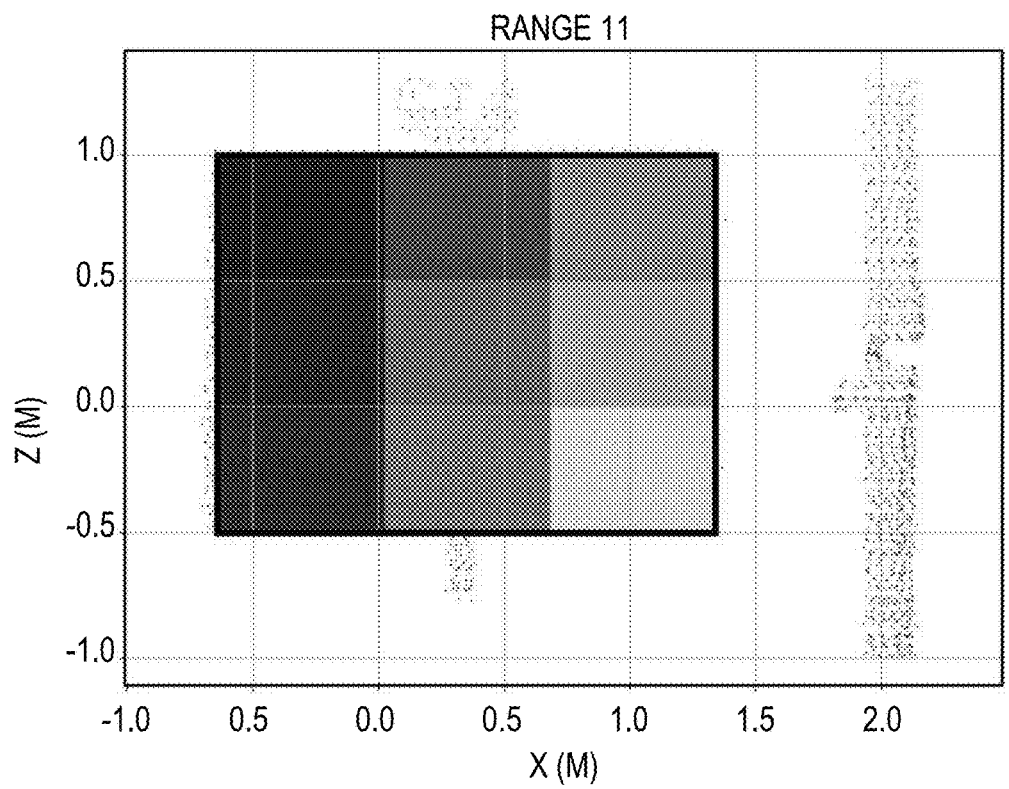
Figure 3M:
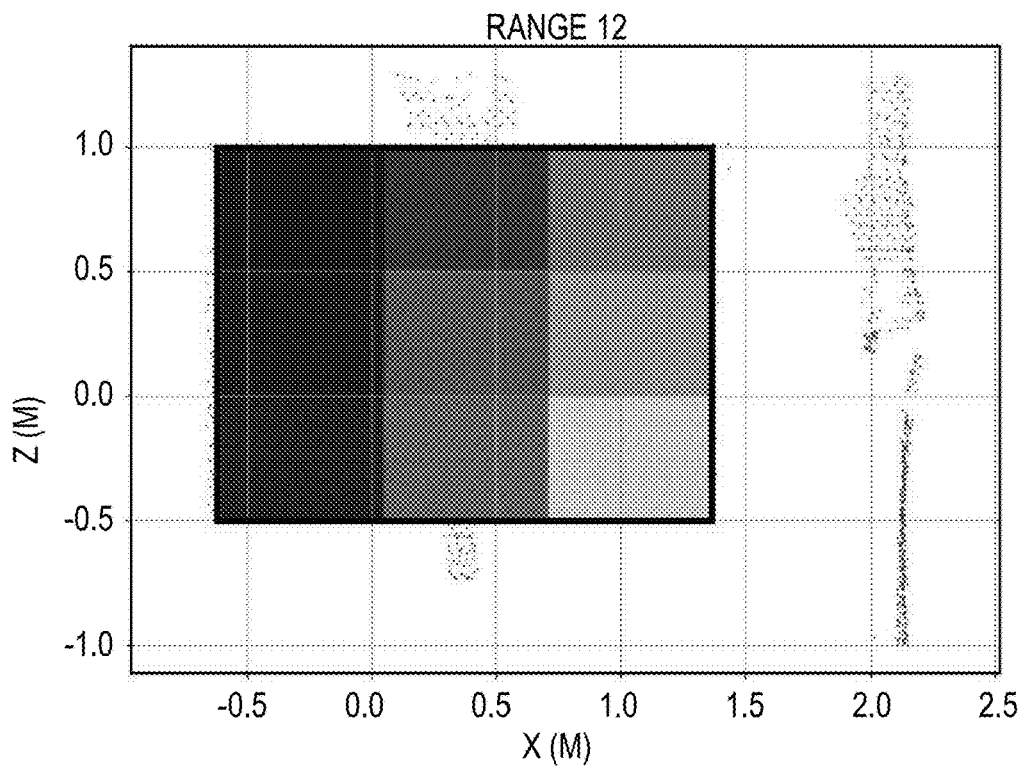
Figure 3N:
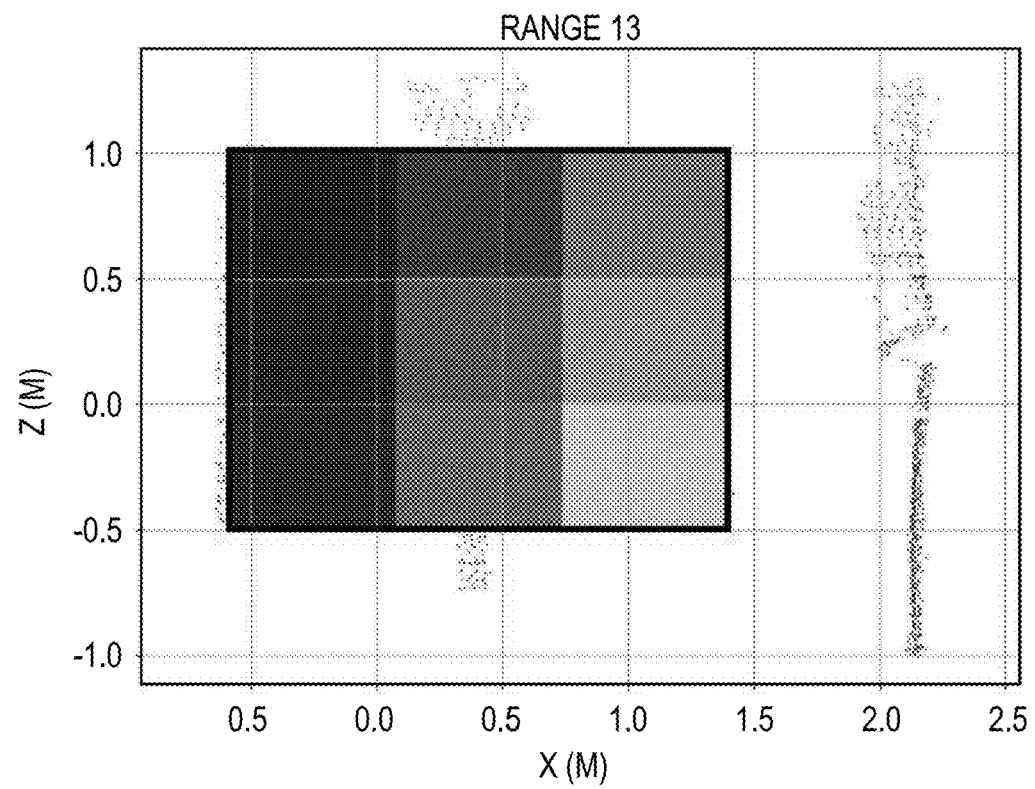
Figure 3O:
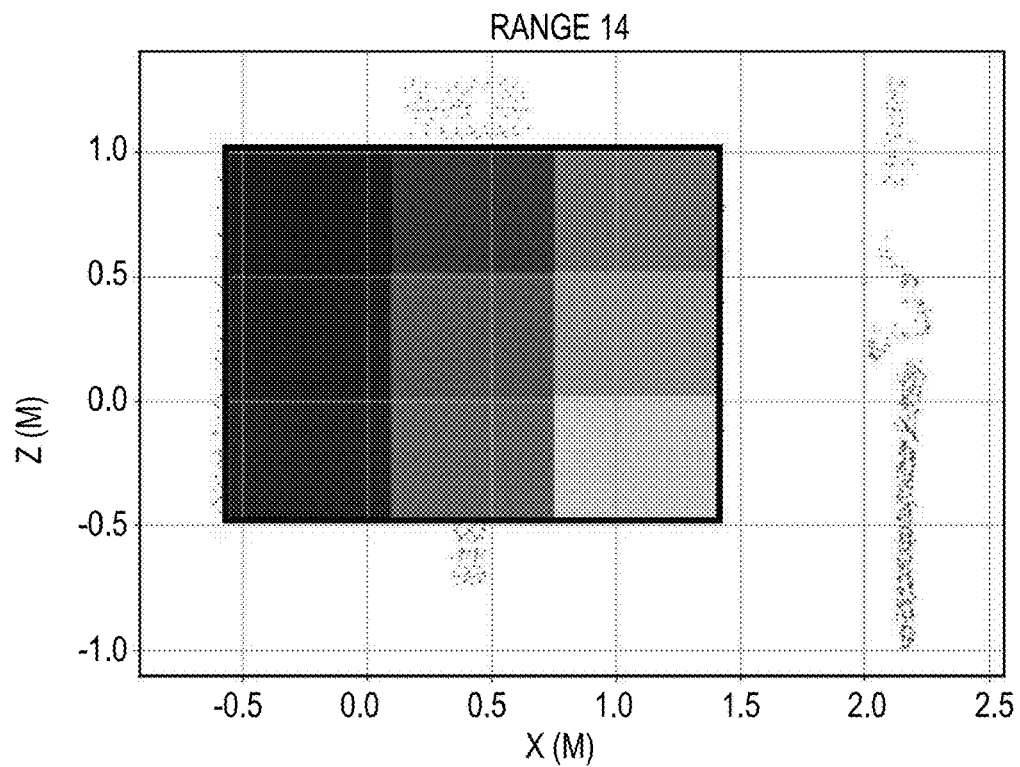
Figure 3P:
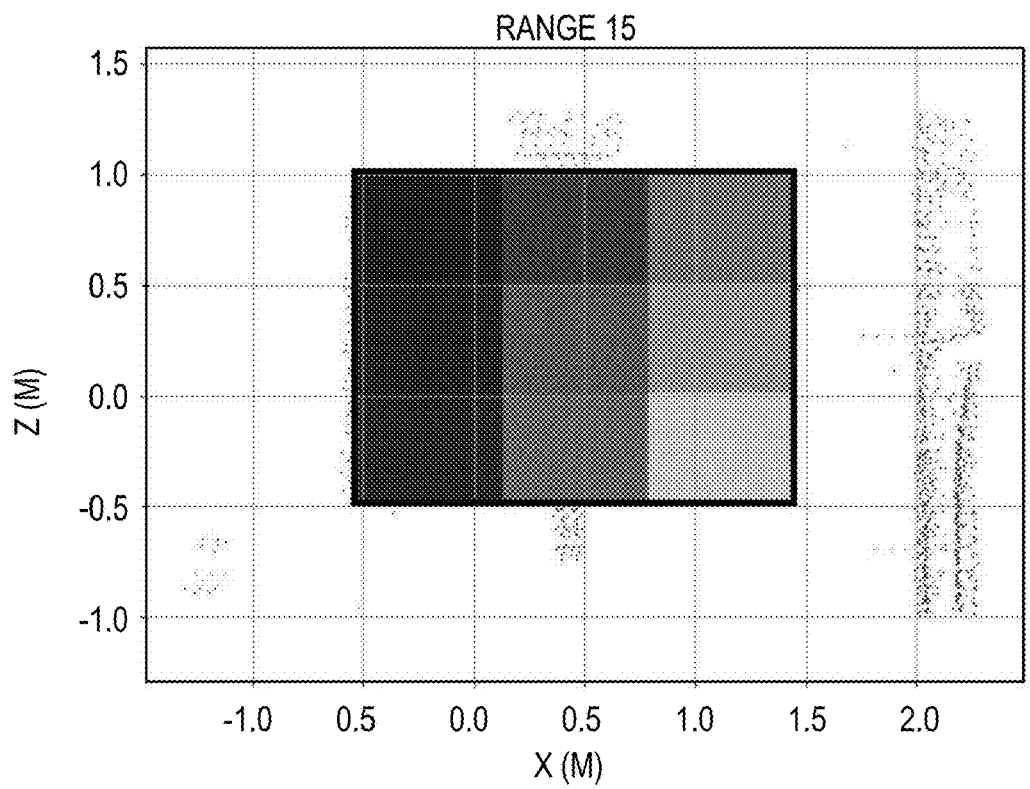
Figure 3Q:
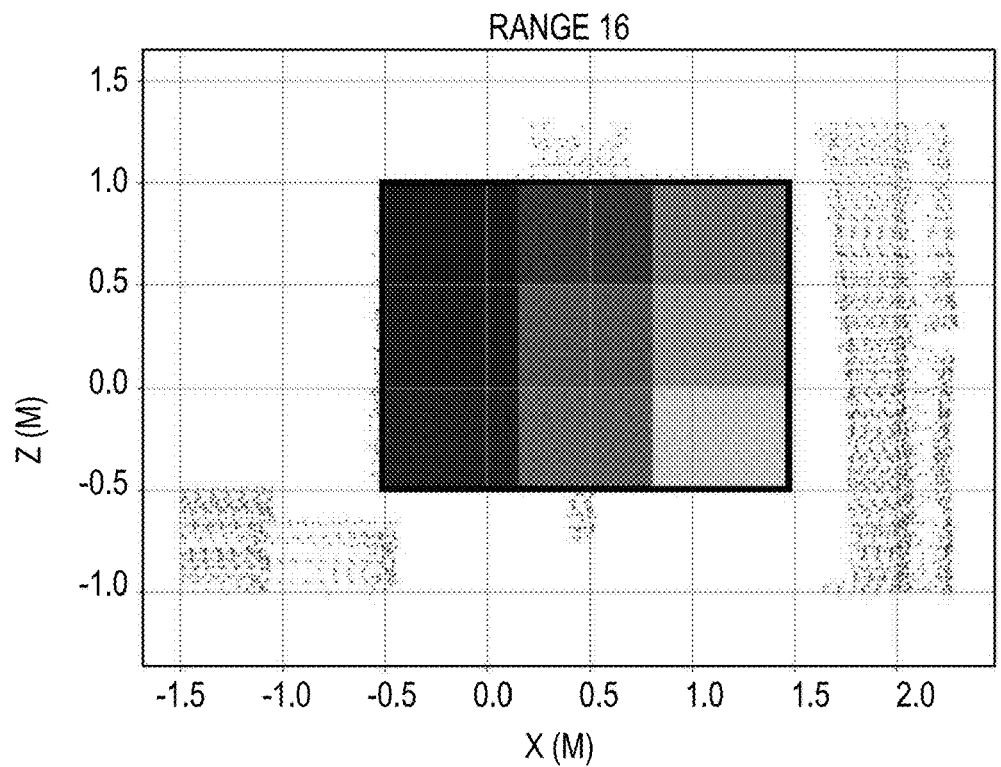
Figure 3R:
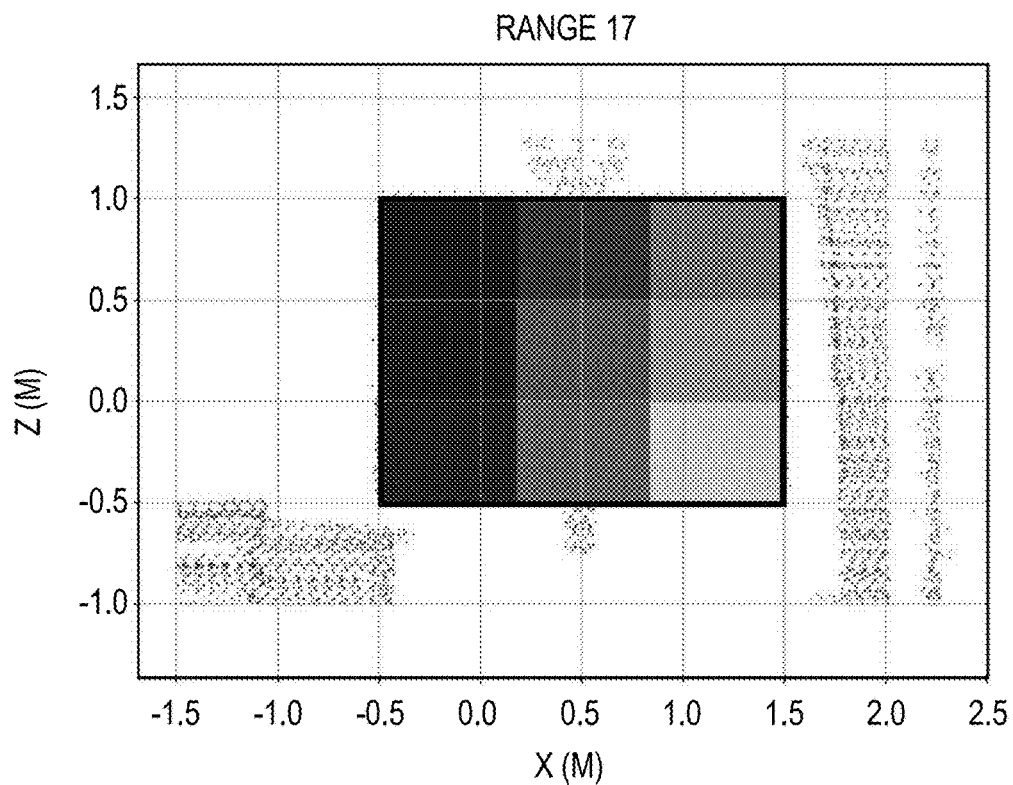
Figure 3S:
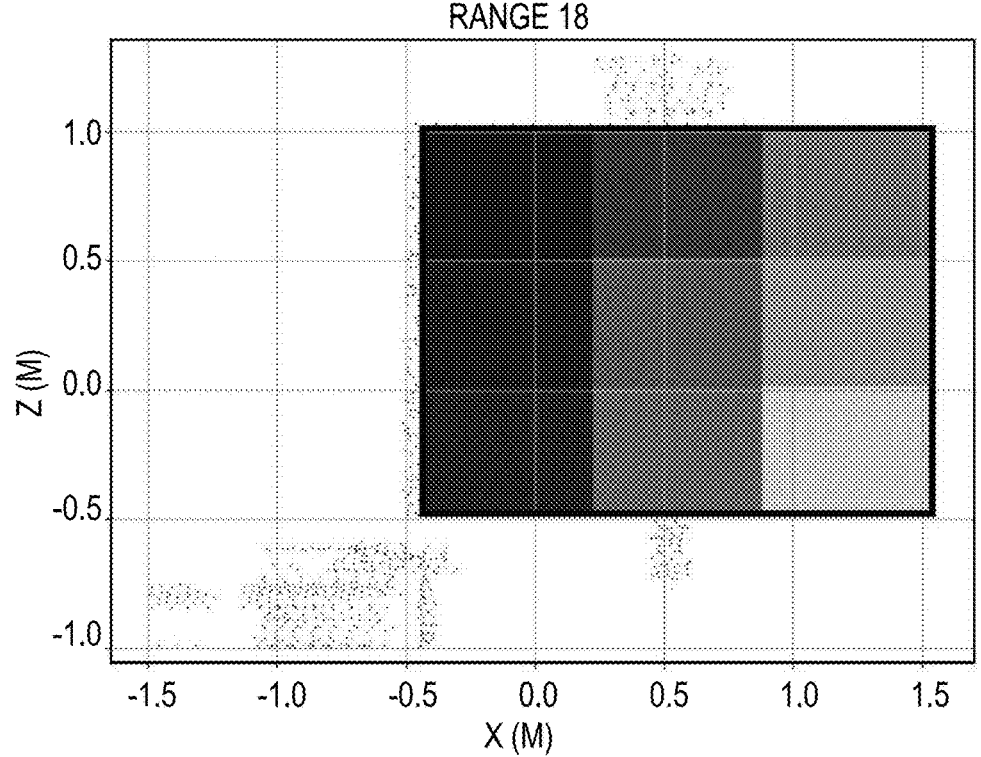
Figure 3T:
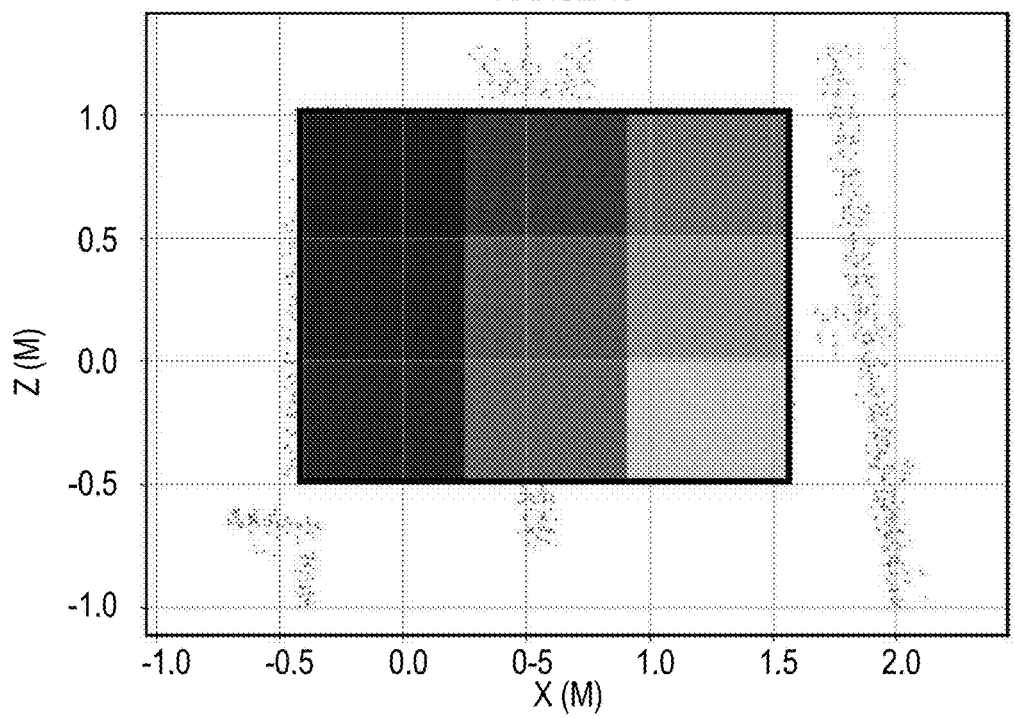
Figure 3U:
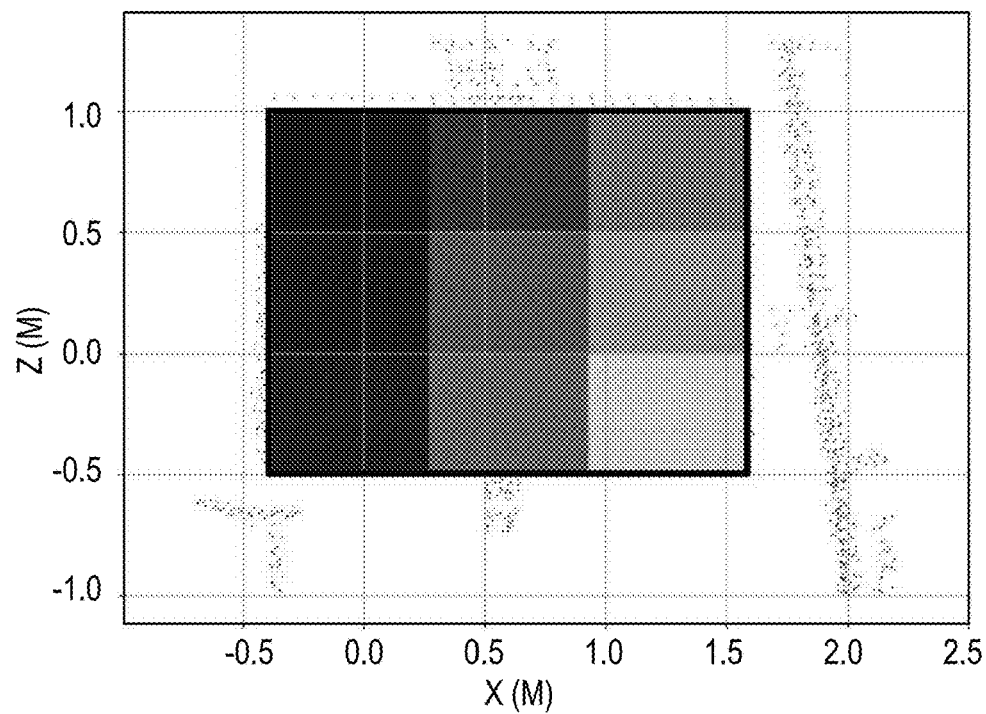
Figure 3V:
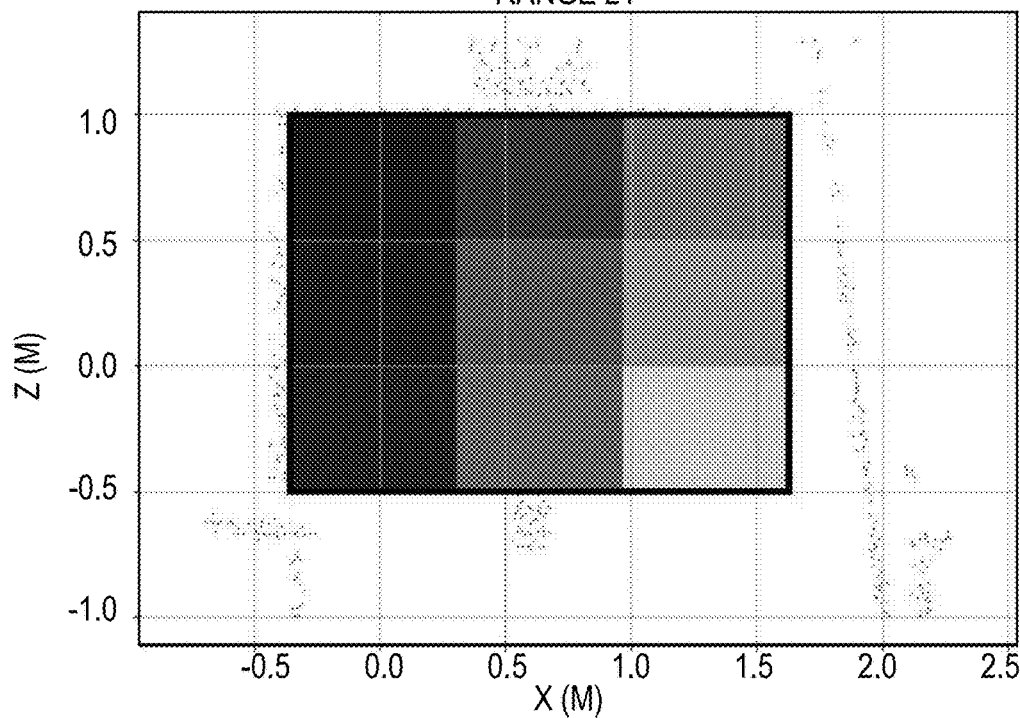
Figure 3W:
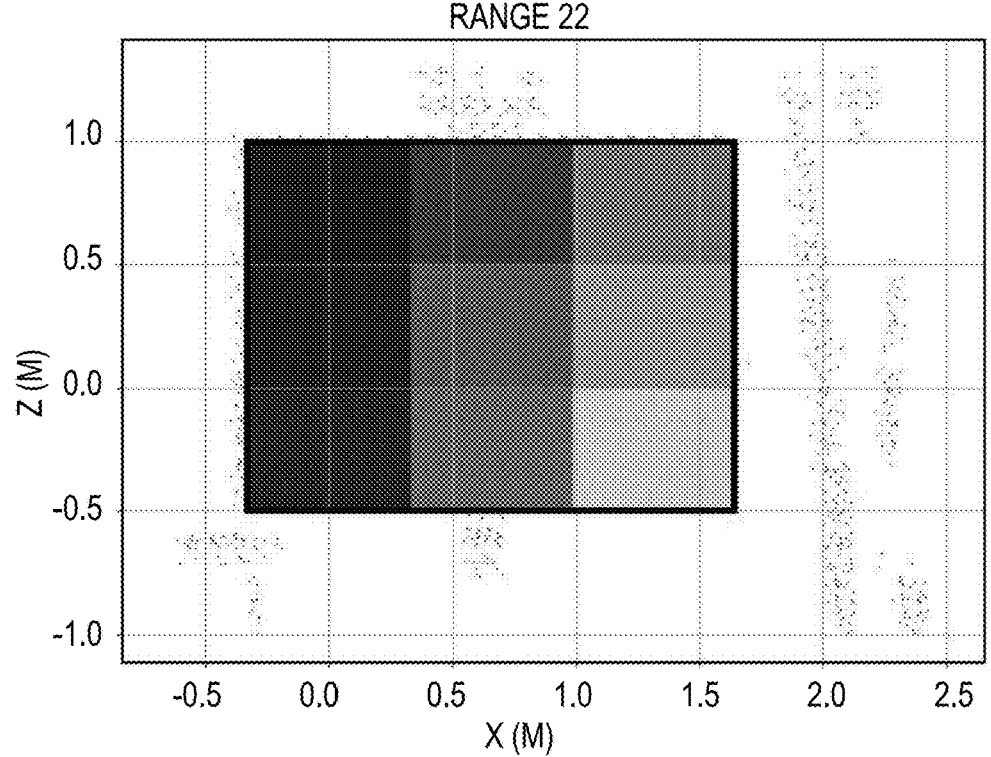
Figure 3X:
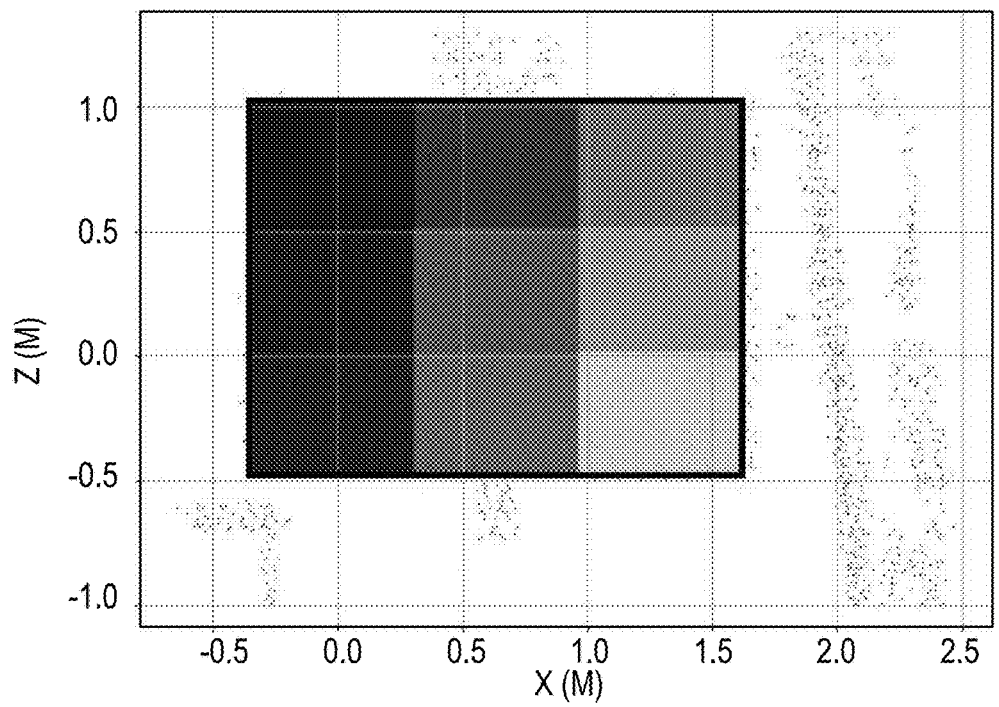
Figure 3Y:
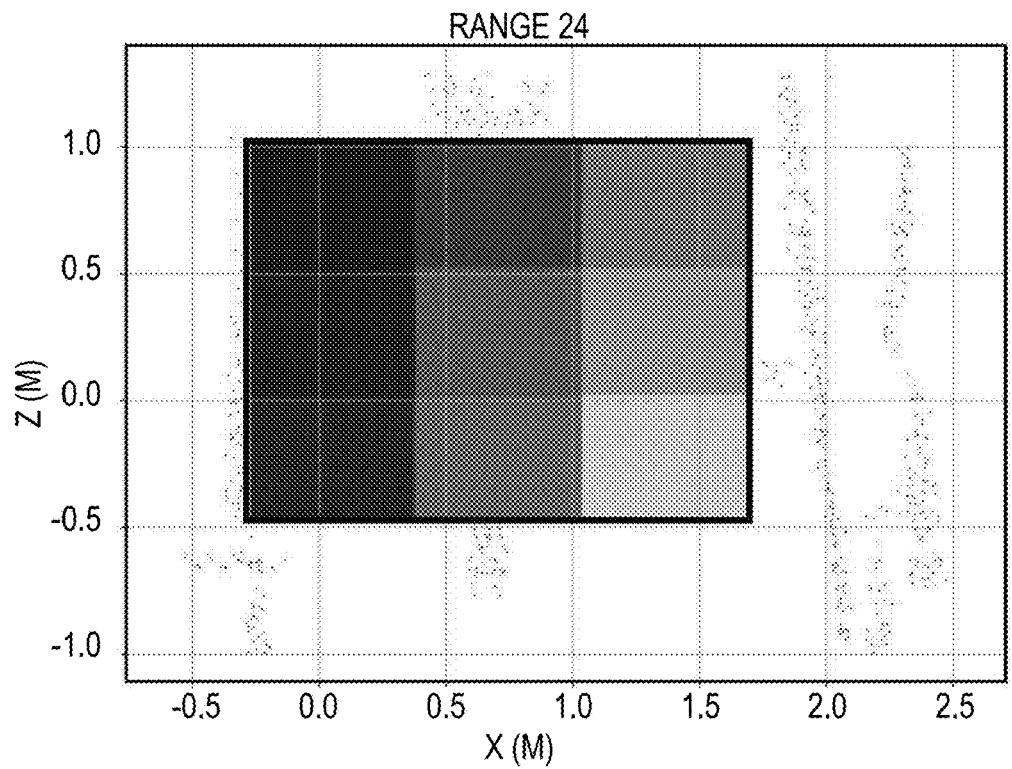
Figure 3Z:
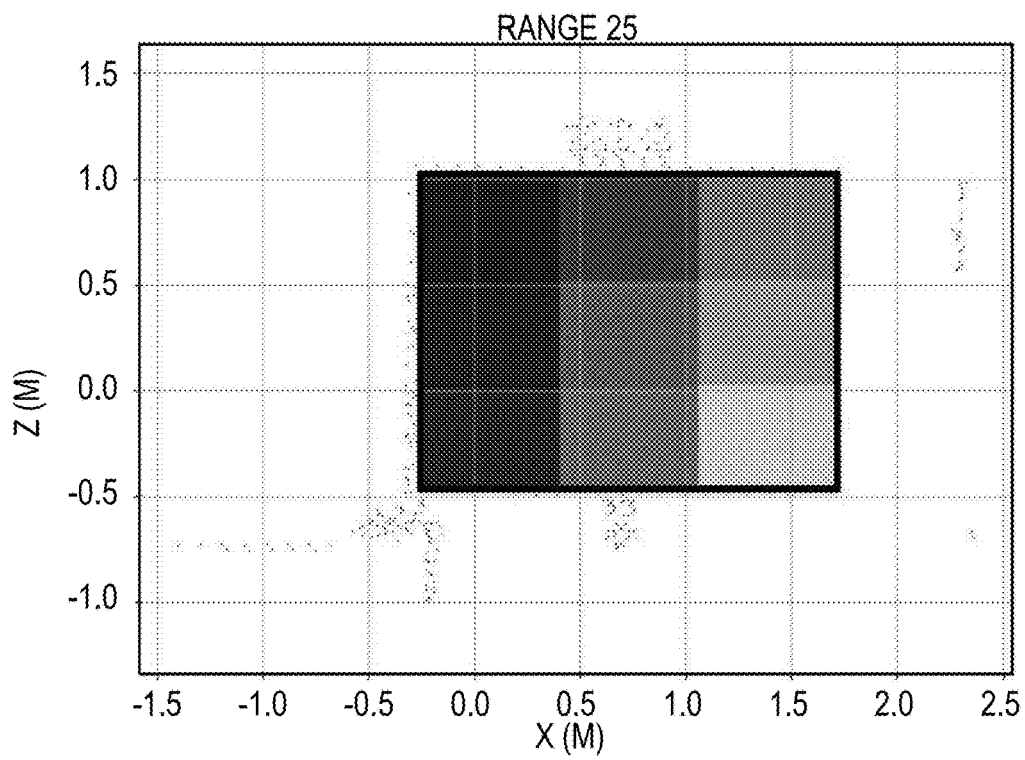
Figure 3A:
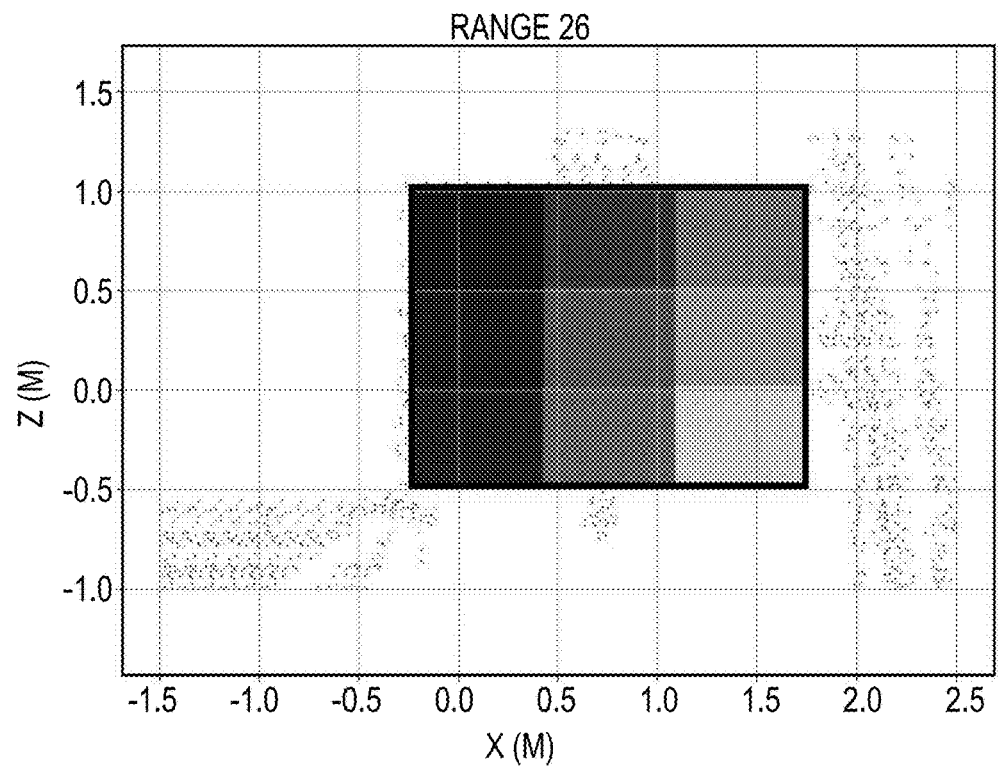
Figure 3A:
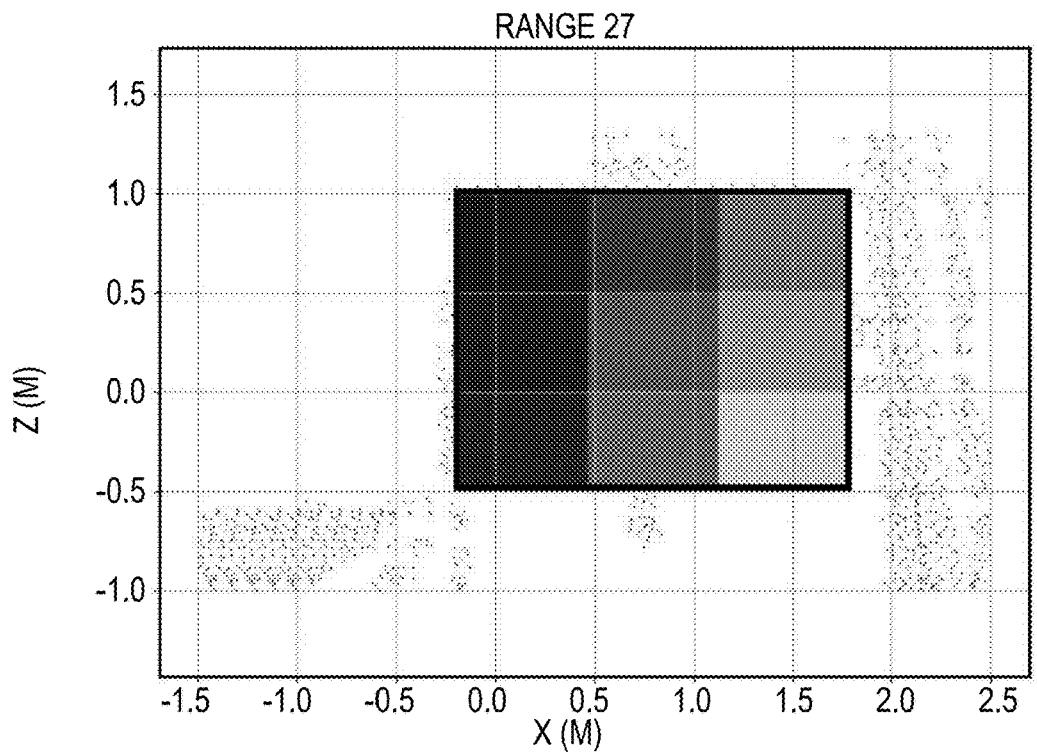
Figure 3A:
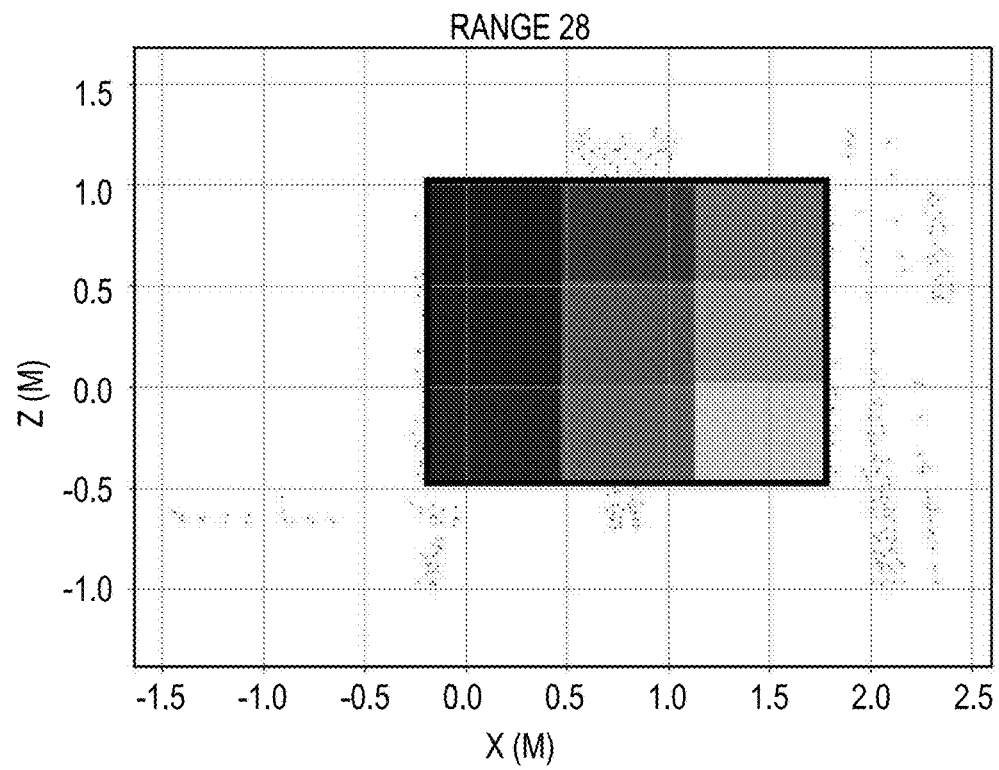
Figure 3A:
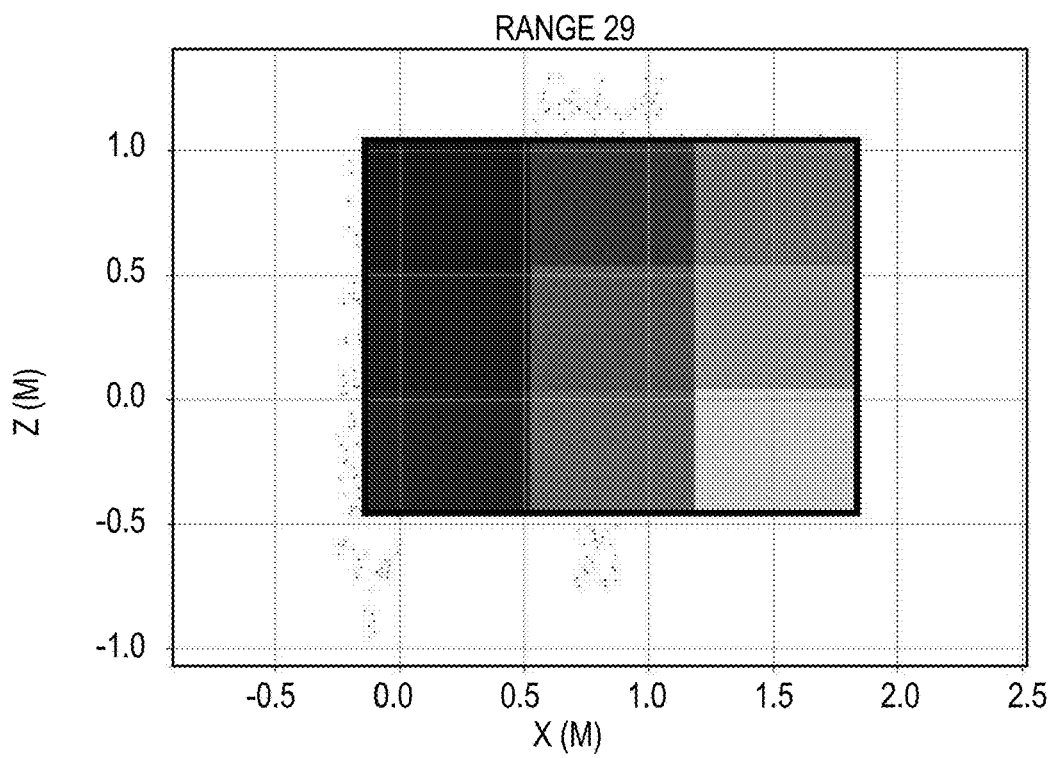
Figure 3A:
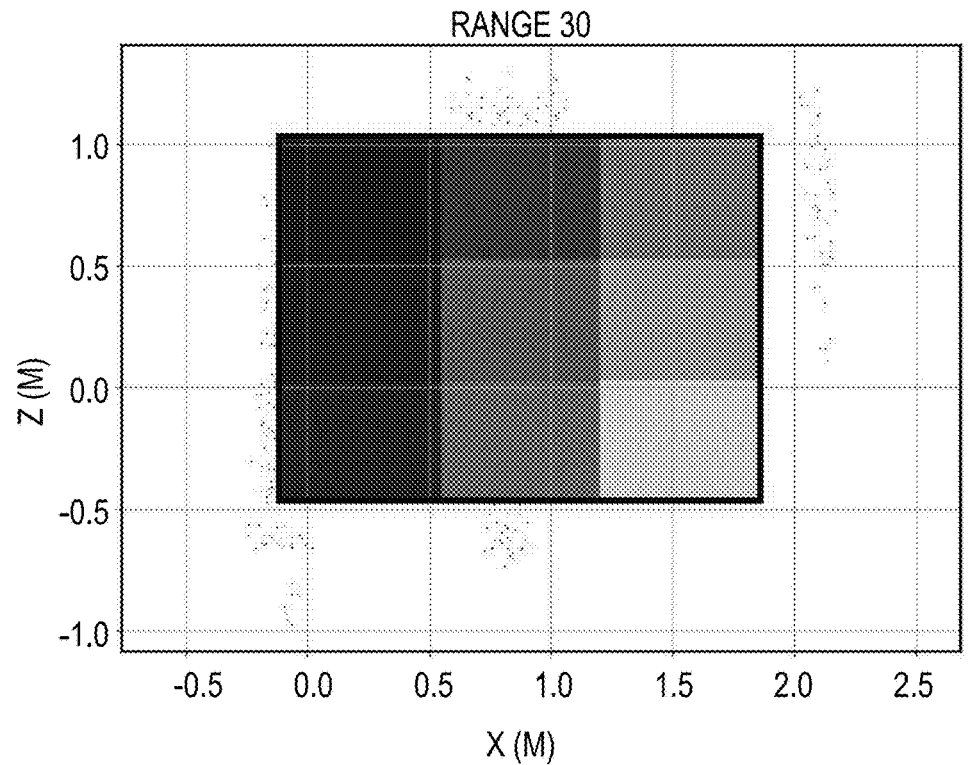
Figure 3A:
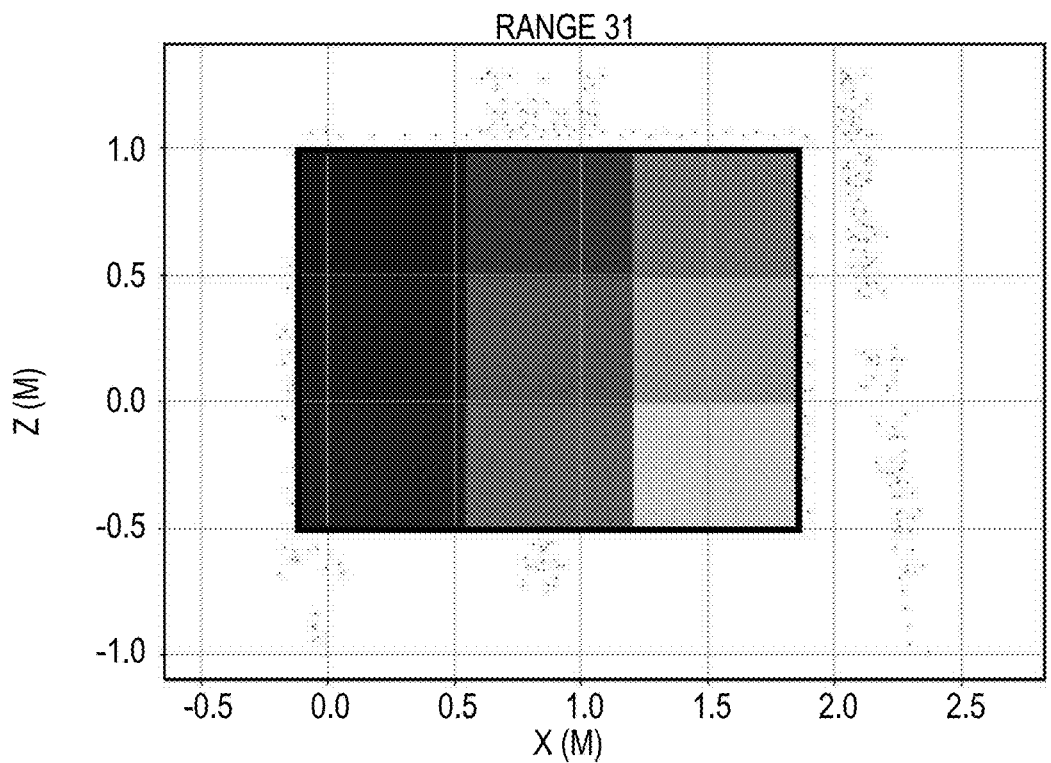
Figure 3A:
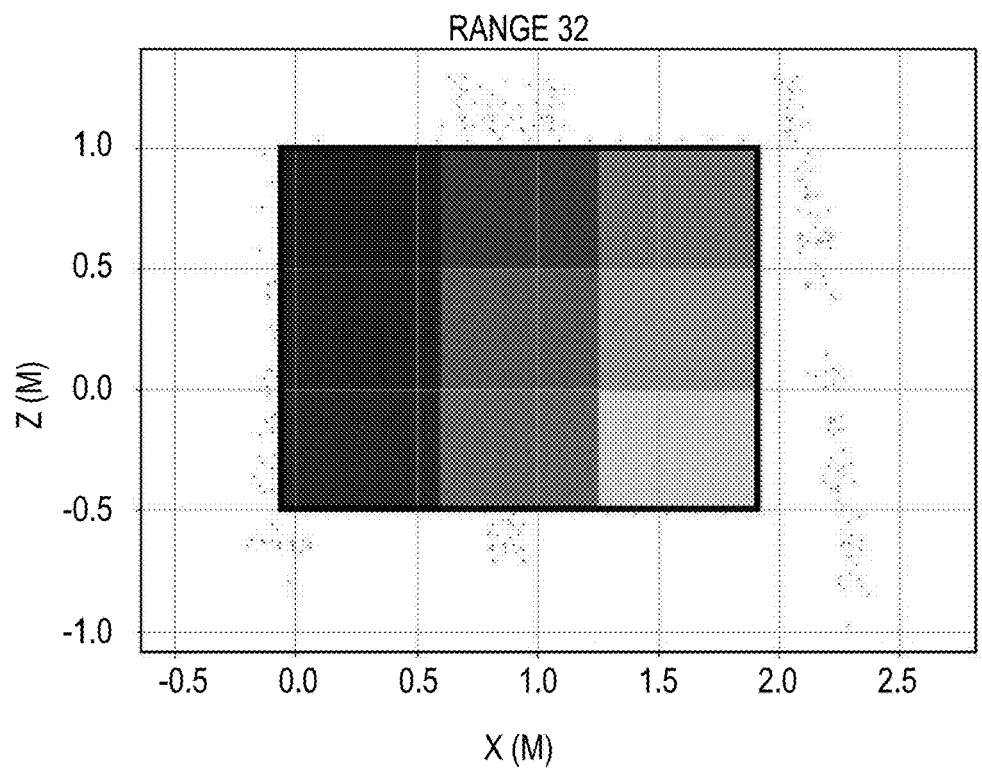
Figure 3A:
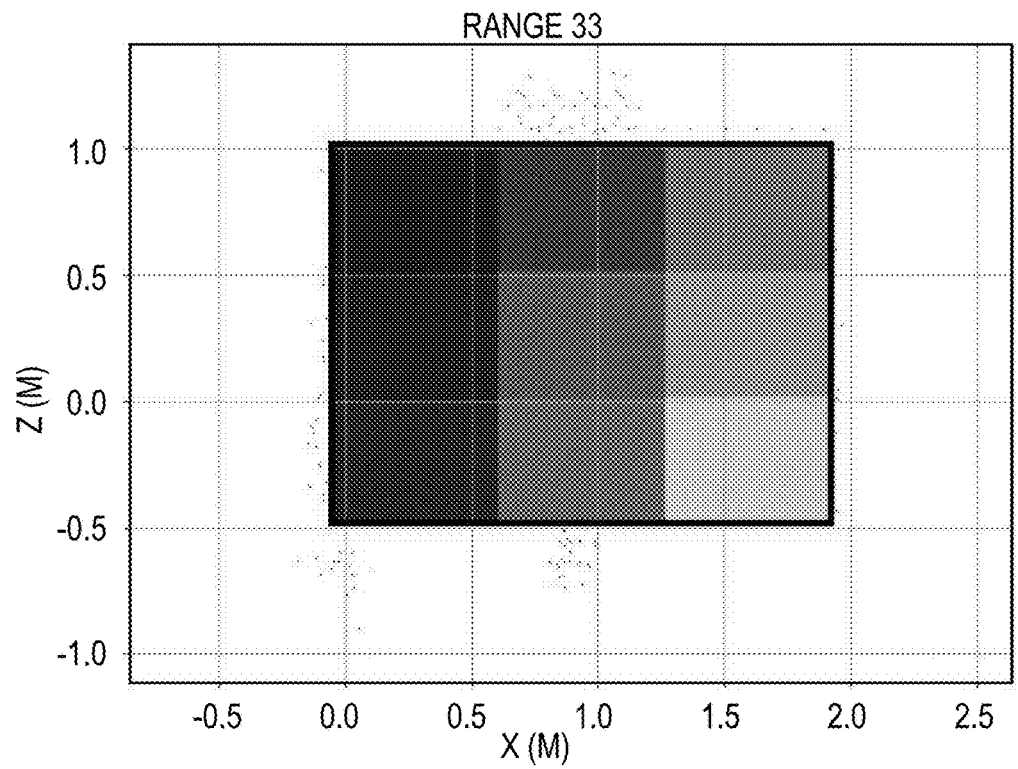
Figure 3A:
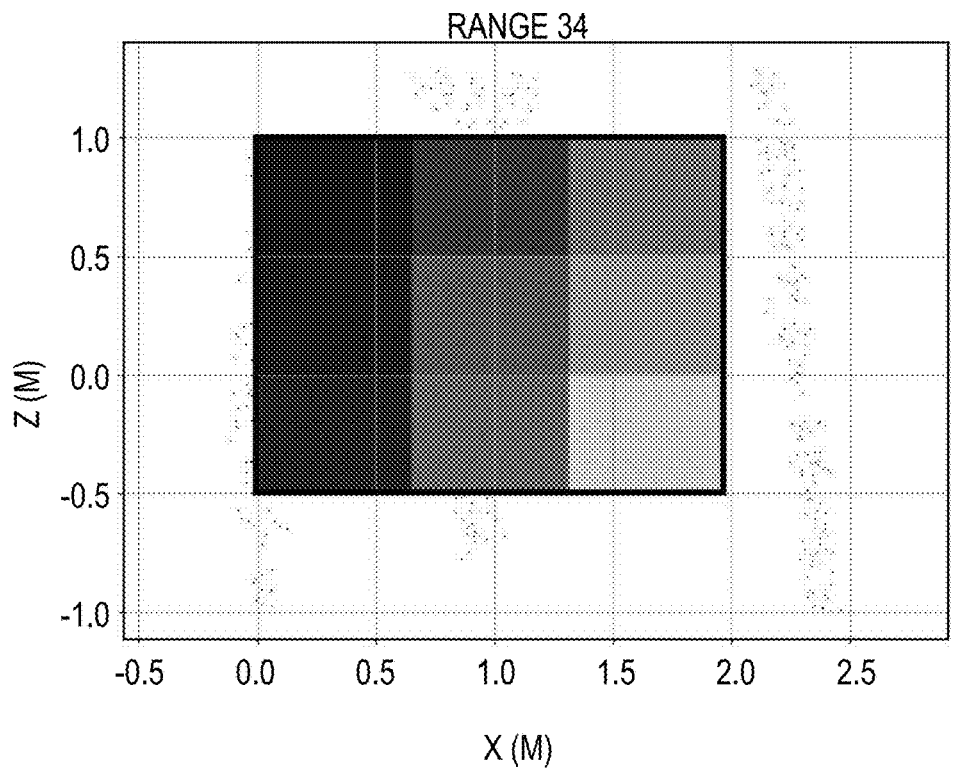
Figure 3A:
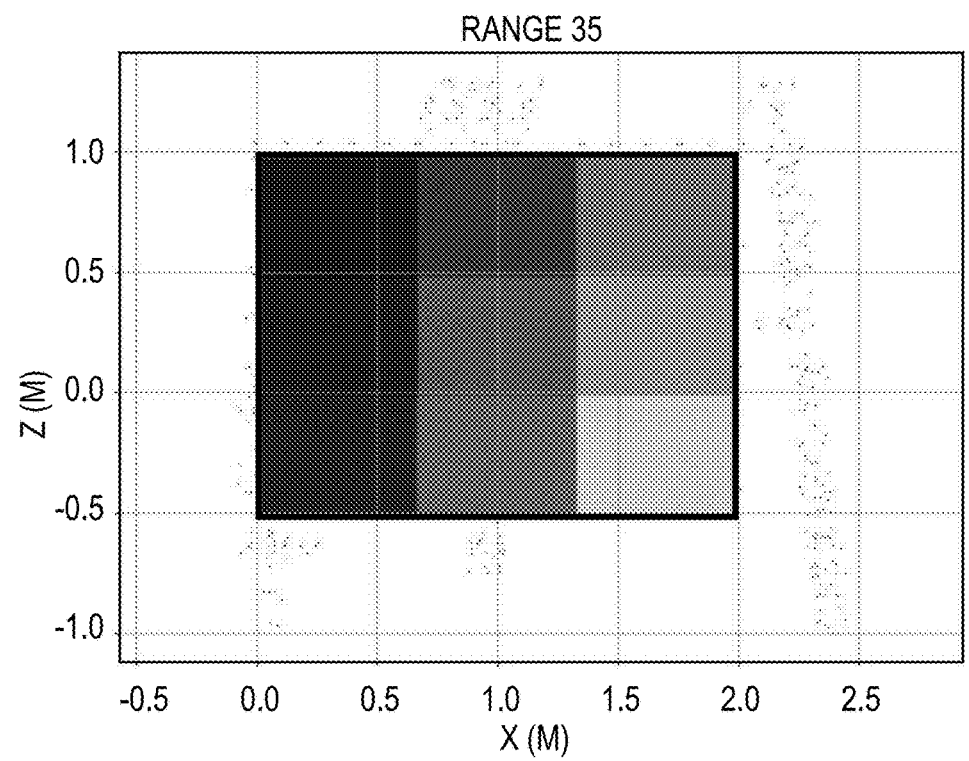

Sample detection is shown in FIGS. 3A-3AJ for labeled panels 0-35 representing ranges 0-35, respectively. The panels are shaded by their ground truth reflectance percentage.

Calibration Approach

Given the association between range, power level, and the known reflectance standards, the calibration procedure is three-fold. First, a characterization step is performed that models the response curve of the lidar. Second, the most likely reflectance value at run time is determined by interpolating across the learned response curve within the feasible power-reflectance curve. Third, a model is developed to determine the uncertainty of the calibrated reflectance motivated by the sharpness of the interpolated signal.

The first step in the calibration algorithm is a full characterization of each beam's intensity response, which determines the following four aspects of the beam's response behavior:

1—The dynamic range of the beam;
2—The feasible power and reflectance combination;
3—The focal distance of the lidar is estimated; and
4—The ideal placement of a B-spline curve (or other parametric forms) to capture the response curve.

Each of the steps is described in more detail below.

Determining the Dynamic Range of the Beam

The dynamic range of the beam's response is the minimum and maximum intensity value corresponding to reflectance measurements and not noise. Due to various factors, such as dark noise, receiver sensitivity, and quantization, the beam's response does not cover the full range of the 256 bits. The dynamic range of the beam may be determined by estimating the minimum and maximum return value across all power levels and distances using the extracted data. The dynamic range was experimentally found to be limited to the range 30-200 and to vary across beams.

Determining the Feasible-Power Range Combination

The power adjustment algorithm often referred to by auto gain may be used. However, it appears that the algorithm adjusts the transmitted power level, such that intensity is within a specific range. The adjustment is desired to ensure intensity returns fall within the optimum range of the receiver as under/over saturated signal provides limited information. For example, a higher power output reflected off a high reflectivity surface is like to oversaturate the sensor and affect the estimated range.

The possible power-reflectance combination is determined by ensuring that the response curve is not flat but has a single sharp peak that is detectable from the parametric form of the lidar's response curve.

Once the possible power-reflectance combinations are determined, any invalid combinations are excluded from the remainder of the calibration procedure. Removing invalid combinations is important for two reasons. First, flat response curves due to under/over-saturation are useless for a calibration process. Second, and more importantly, the lidar's auto-gain algorithm provides reliable clues to the actual reflectance of the data.

Calibration Procedure

The calibration procedure is performed on all "valid" lidar returns. A return is valid if each of the following conditions is satisfied:

The raw intensity return is within the dynamic range; and
The return's range is within the distances measured by the calibration rail 120.

Given a valid return and the lidar power, all of the learned nine response curves are evaluated from the training data. That is, for every panel 110, the following is computed:

curve_refectance_response,confidence=$f\_p$(range, raw_intensity)

The curve_reflectance_response is the learned reflectance value using the calibration procedure, while confidence is a measure of the probability that the (range, raw_intensity) pair is generated from a surface with reflectance=curve_reflectance_response.

Given the expected curve_reflectance_response and the associated confidence, the return's reflectance may be determined by fitting a parabola to the curve_reflectance_response in the vicinity of or at the value of the curve_reflectance_response with the highest probability. This step is referred to as sub-reflectance estimation, which allows estimation of a continuous reflectance value from the training data, which is limited to nine reflectance values.

Finally, the estimated return reflectance is reported along with a measure of uncertainty. This uncertainty is computed using the confidence values from the curve fitting in combination with the sharpness of the sub-reflectance parabola peak. A higher peak in sub-reflectance estimation indicates a higher confidence in the calibration values. Estimated reflectances with insufficient confidence are discarded using an empirically determined threshold.

Figure 4:
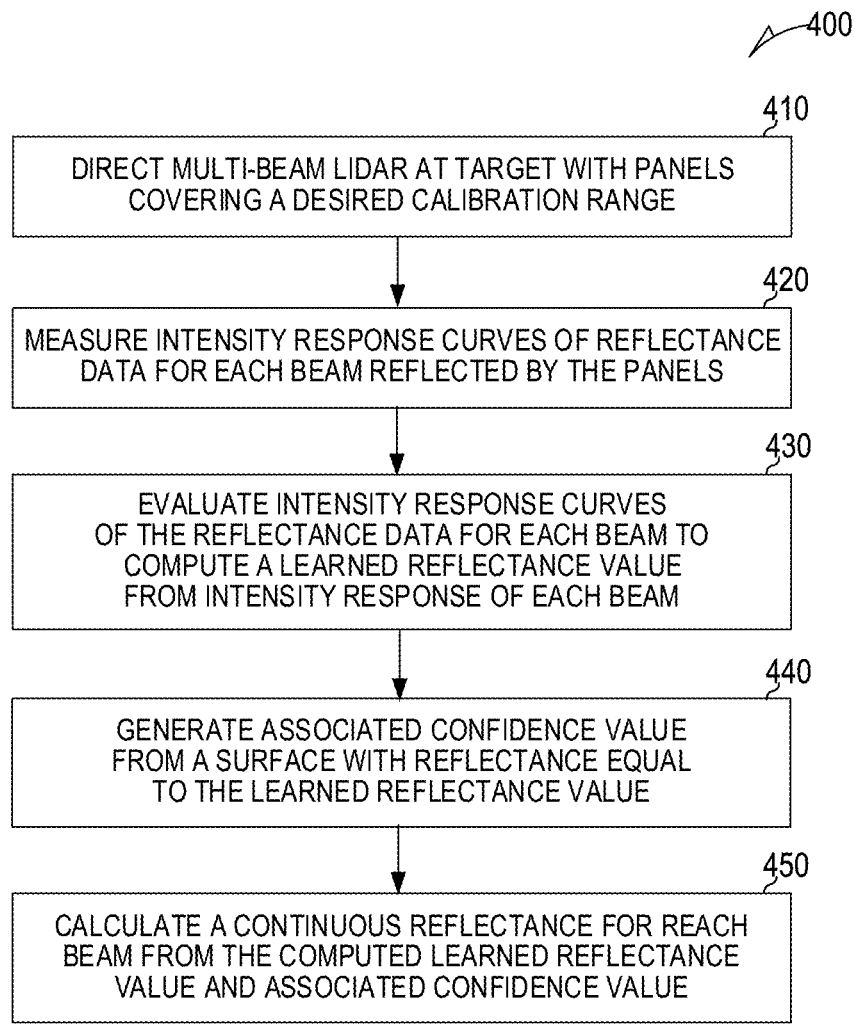
FIG. 4 illustrates a method of calibrating multi-beam lidar intensity in a sample embodiment.
Figure 5A:
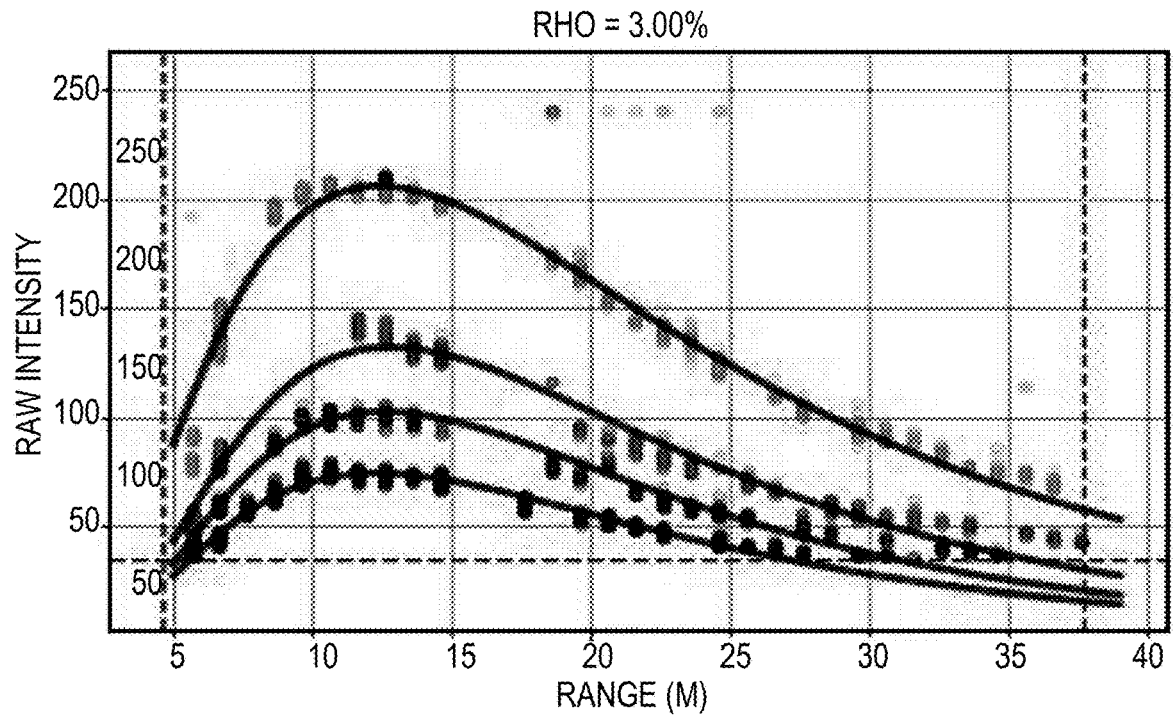
FIGS. 5A-5I illustrates an example of the fit of the lidar response curve from a single beam across different lidar power levels along with the estimated log-normal power law.
Figure 5B:
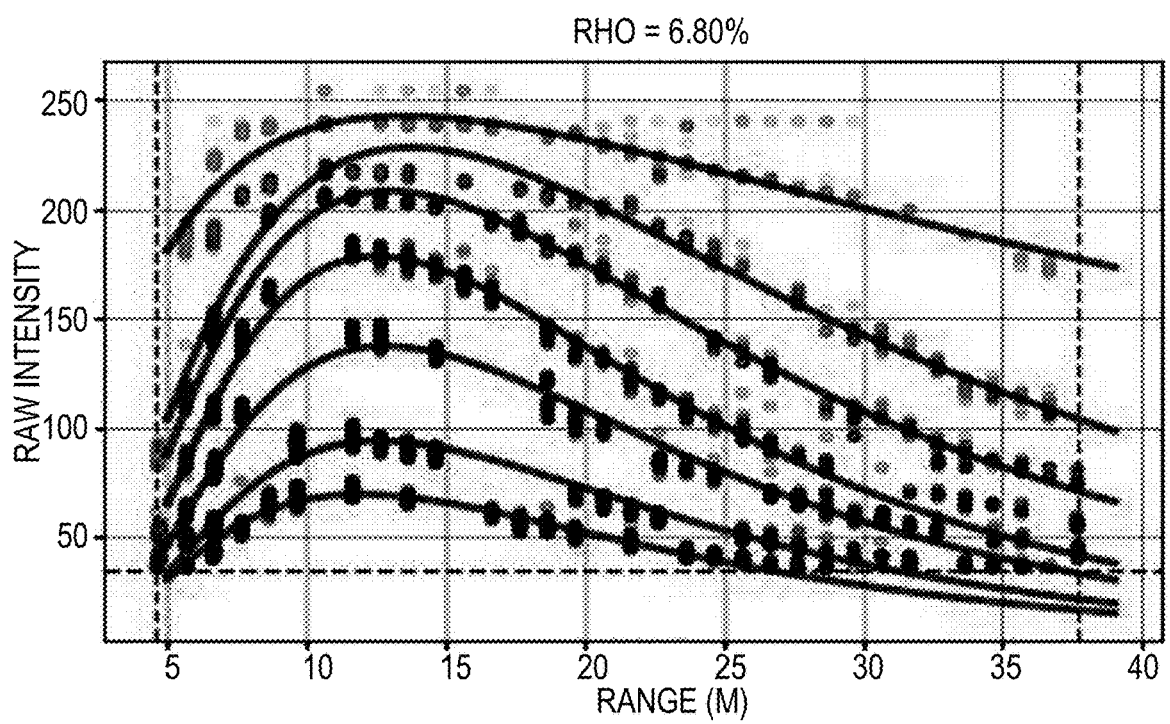
Figure 5C:
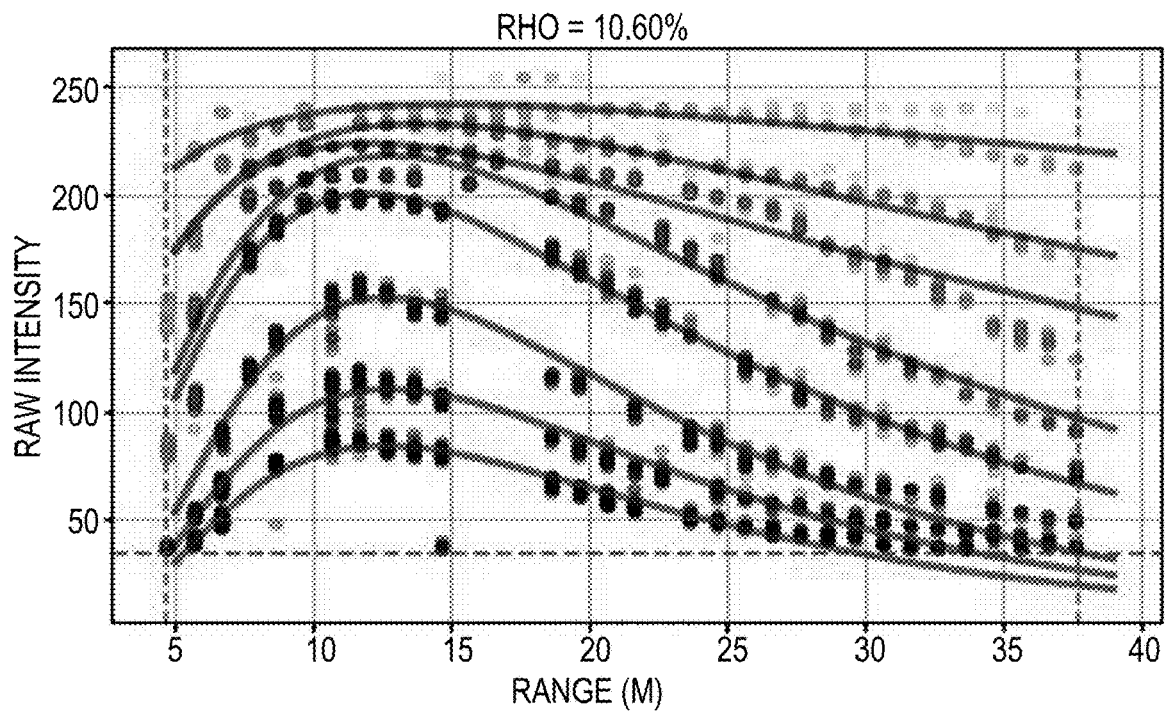
Figure 5D:
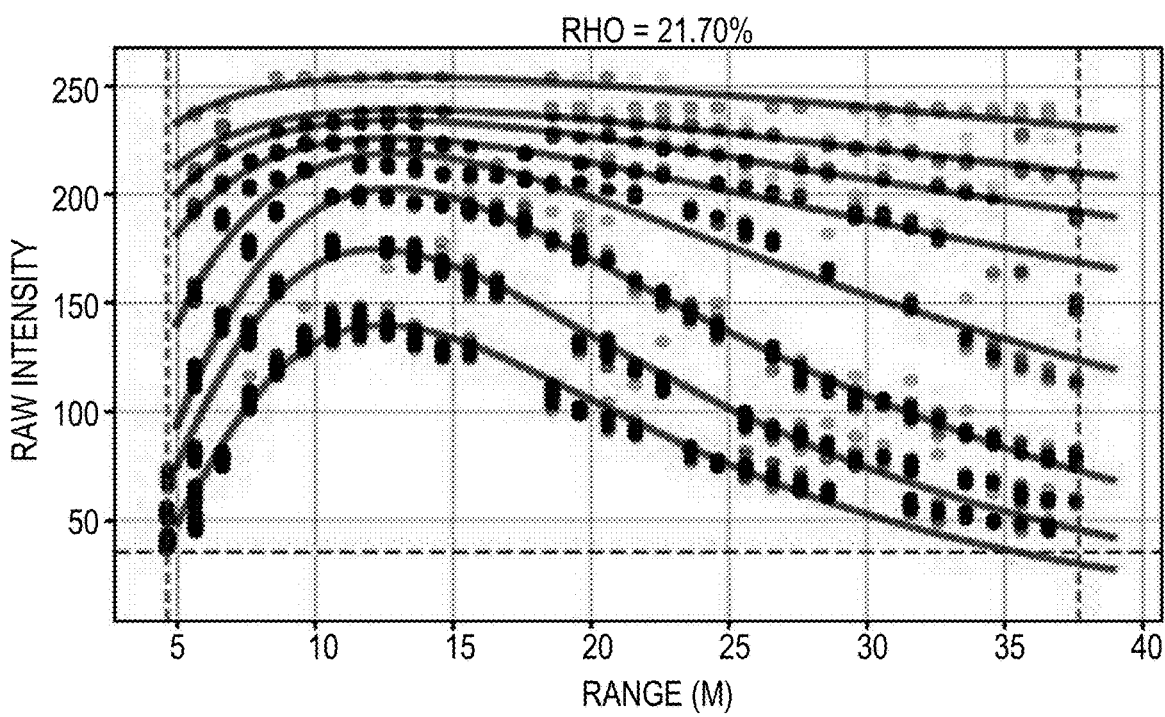
Figure 5E:
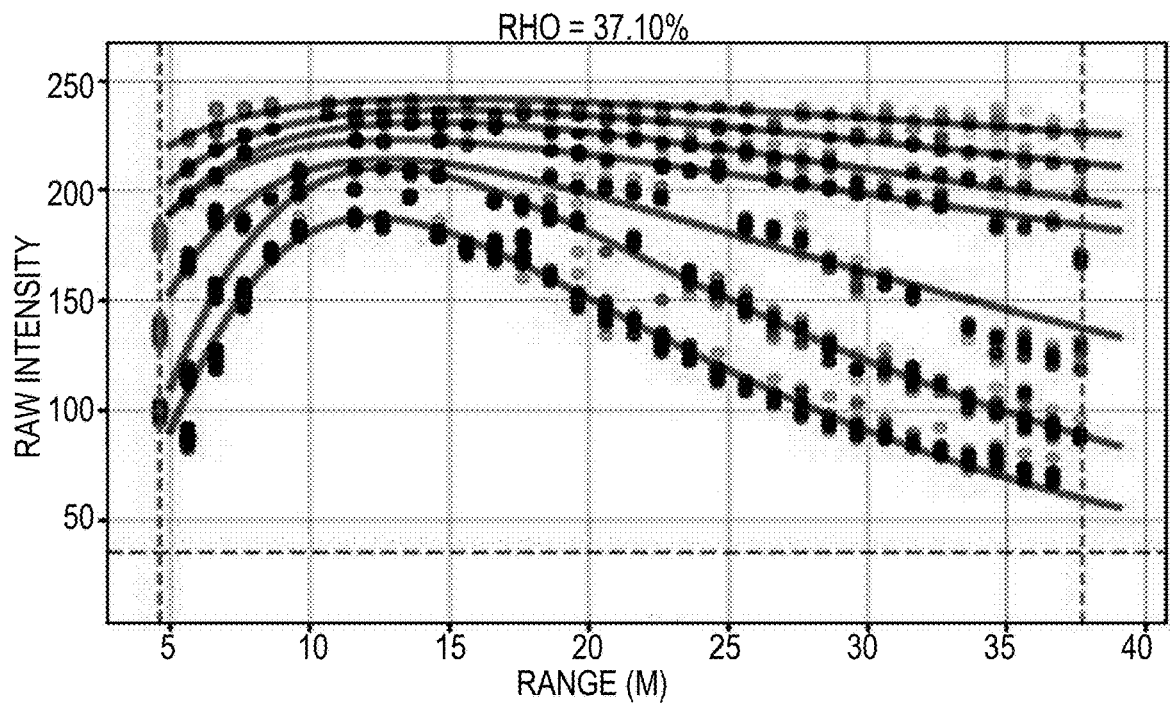
Figure 5F:
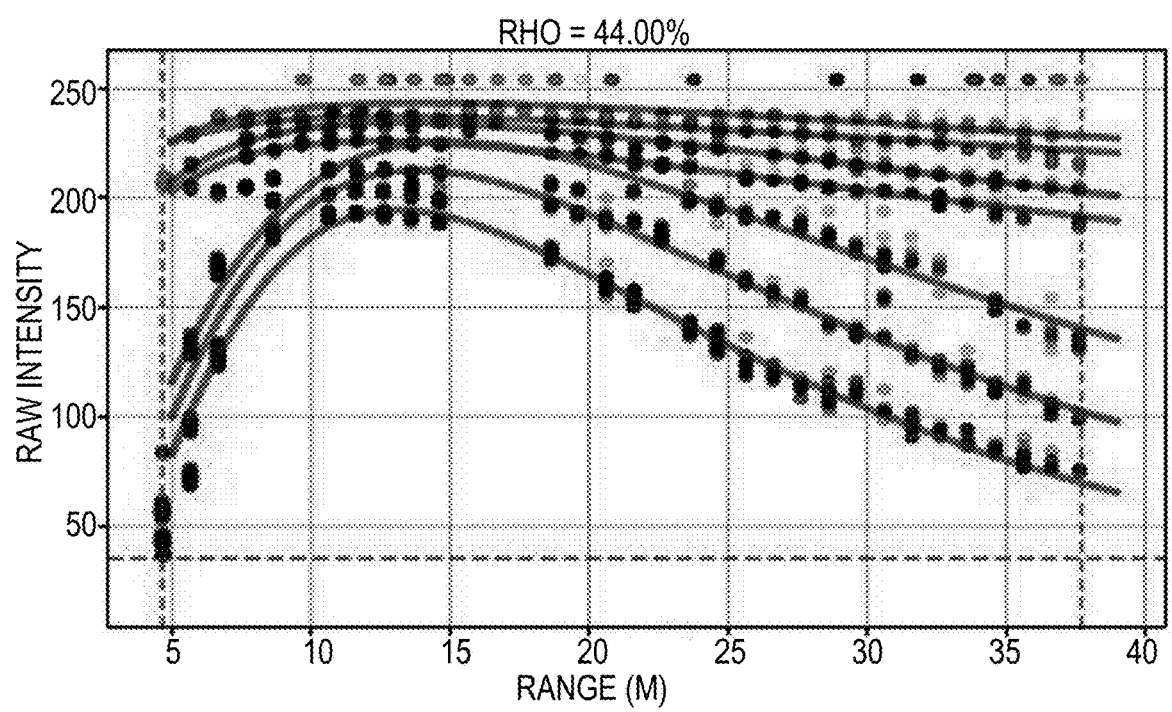
Figure 5G:
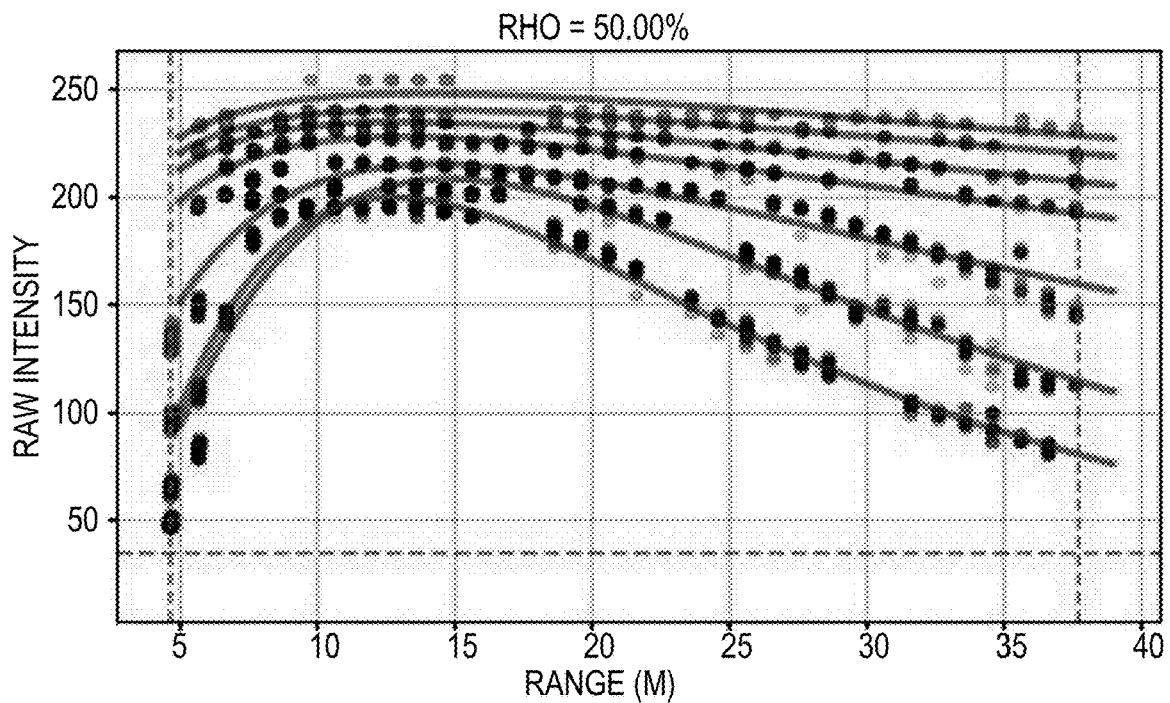
Figure 5H:
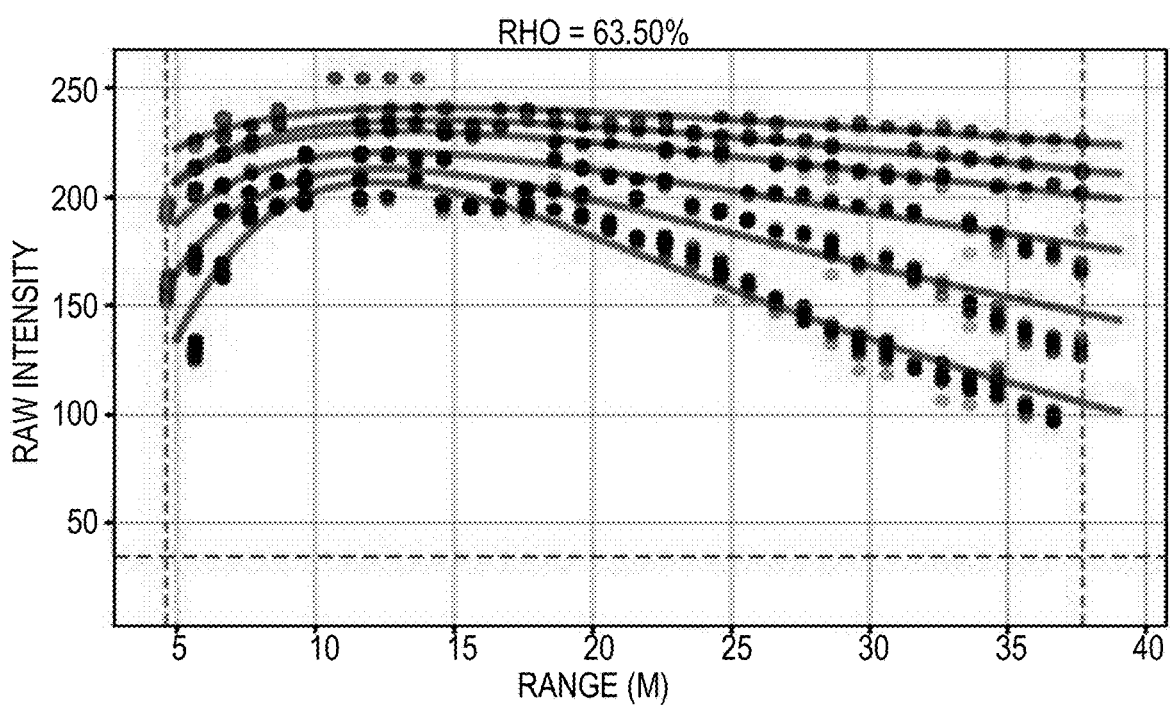
Figure 5I:
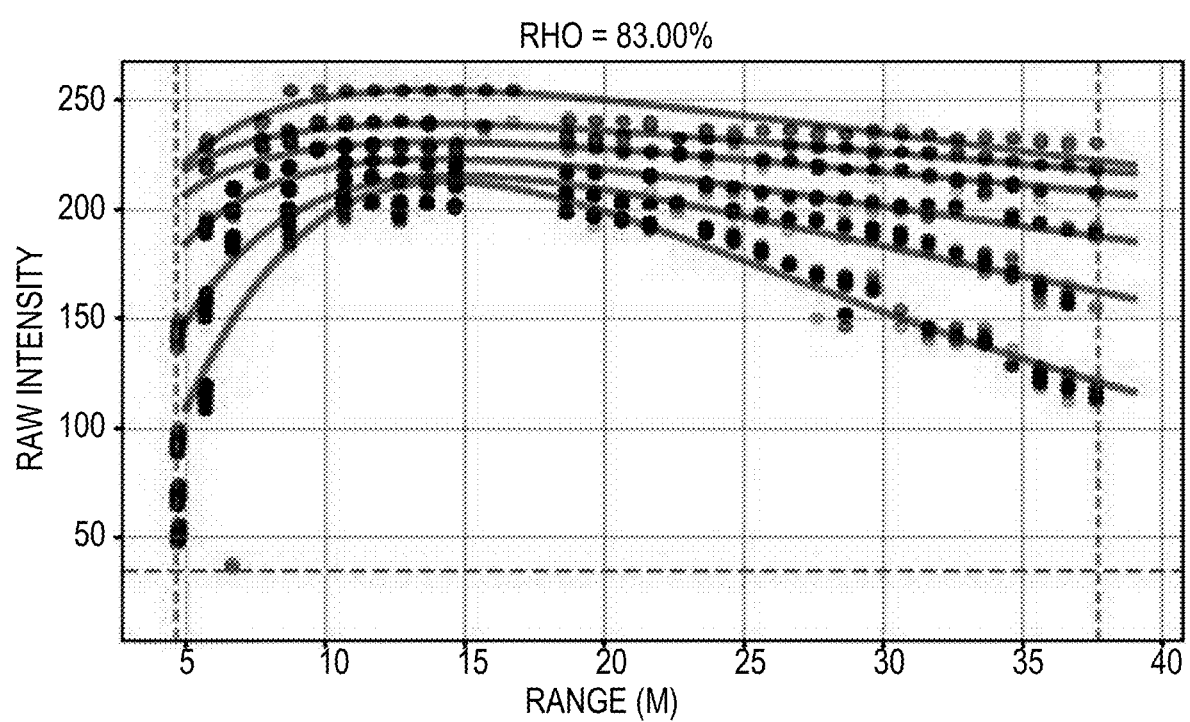
Figure 6A:
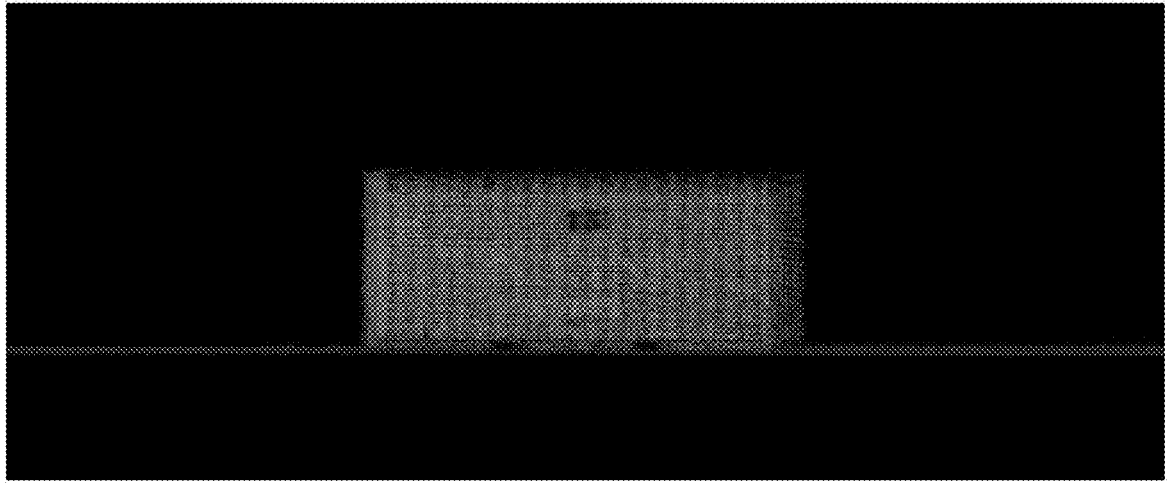
Figure 6B:
Figure 6C:
Figure 6D:
Figure 6E:
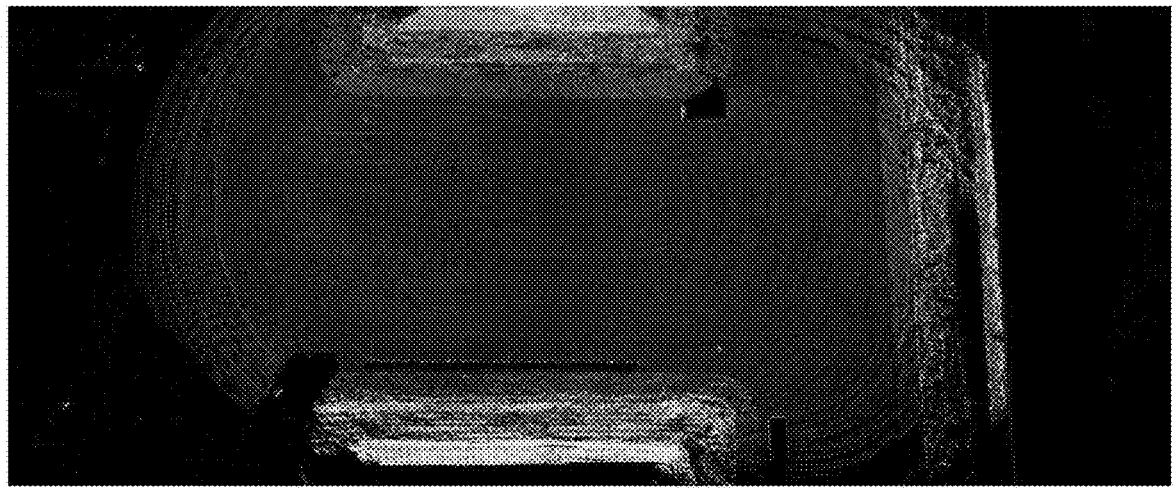
Figure 6F:
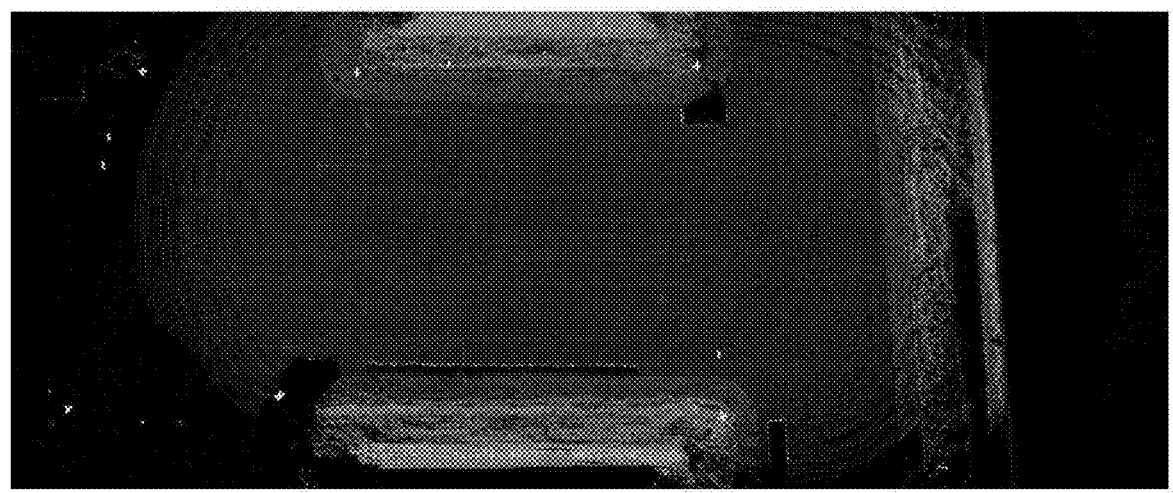
Figure 6G:
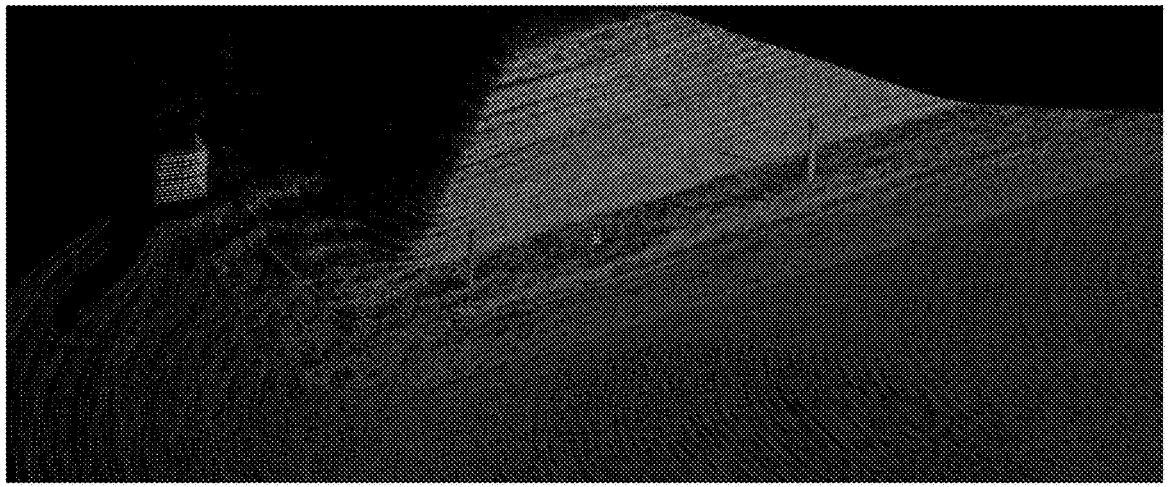
Figure 6H:
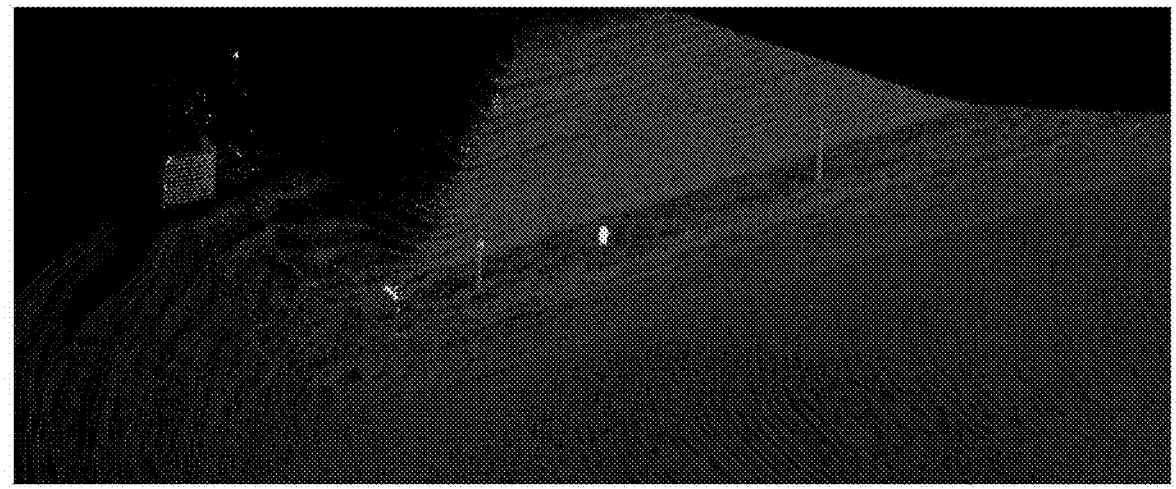

FIG. 4 illustrates a method 400 of calibrating multi-beam lidar intensity in a sample embodiment. As illustrated, the method of calibrating multi-beam lidar intensity comprises directing multi-beam lidar at a target comprising at least two panels of different reflectance standards covering a desired calibration range at 410 and measuring intensity response curves of reflectance data for each beam of the multi-beam lidar reflected by the two or more panels at 420. The intensity response curves of the reflectance data for each beam of the multi-beam lidar is evaluated to compute a learned reflectance value from an intensity response of each beam at 430. An associated confidence value defined as a measure of a probability that a range and raw intensity pair is generated at 440 from a surface with reflectance equal to the learned reflectance value. Then, from the computed learned reflectance value and associated confidence value, a continuous reflectance for each beam is calculated at 450 by fitting a parabola to the learned reflectance value in a vicinity of or at a value with a highest probability.

Form of the Response Curve

Based on experimental evaluation, the response curve of the lidar at power (p) is well-approximated by the shape of the log-normal power-law distribution, which takes the form:

$$f_p(i, r) = \frac{c}{r}\exp\left(-\frac{\|\log i - l\|^2}{\sigma}\right),$$

where:
i is a raw lidar intensity at given power p;
r is the range to the target,
c, l, and σ are the parameters of the log normal power law to be estimated.

It is noted that the response curve follows the shape of the log-normal power-law distribution but is not normalized to a probability density. FIGS. 5A-5I illustrates an example of the fit of the lidar response curve from a single beam across different lidar raw intensity power levels over a range of distances from 1 meters to 40 meters along with the estimated log-normal power law for reflectances (rho values) equaling 3.0%, 6.8%, 10.6%, 21.7%, 37.1%, 44.0%; 50.0%, 63.5%, and 83.0%, receptively.

Determining the Lidar Calibrated Intensity and its Reflectance

The process of determining a calibrated intensity value (reflectance) from the raw measurements makes use of the learned parametric forms described above. The calibrated intensity is determined to be the reflectance associated with the parametric form that minimizes the deviation between the curve's response and the raw intensity measurements. Namely, for every learned curve given ground truth reflectance ρ, the cost curve is given by:

$$C_p(\rho; i, r) = |f_p^\rho(r) - i|,$$

where i is the raw intensity at the given power p.

Since a nice ground truth reflectance value can be obtained, the cost curve has nine entries. The calibrated intensity is the one associated with the lowest cost, namely:

$$p^* = \underset{\rho}{\operatorname{argmin}}\, C_p(\rho; i, r)$$

To improve the precision of the estimated reflectance, the final calibrated value is obtained as the minima of a quadratic fit using cost in the vicinity of or at the optimal value above.

Finally, a measure of uncertainty of the calibrated intensity value is computed as the ratio between the second-best cost and the first. The rationale is to assign higher certainty when the shape of the minima is sharp.

Results

Calibration data is collected for all powers using CYCLE_MODE, where the Lidar goes through powers 0-7. AUTO_POWER data is also collected to model the probability of the lidar's auto gain algorithm selecting a certain power given ground truth reflectance and range including expected behavior, higher power at lower reflectance, and higher power at longer distances. Comparisons are provided in FIG. 6 for real data collected with AUTO_POWER. The results are shown for the upper block only; the lower block requires a different treatment.

FIGS. 6A-6J illustrate examples that show the result of the calibrated data where the top images (FIGS. 6A, 6C, 6E, 6G, and 6I) illustrate the results using a state-of-the-art current intensity calibration procedure, while the bottom images (FIGS. 6B, 6D, 6F, 6H, and 6J) illustrate the results using the disclosed calibration procedure. For example, a sharper result and better detection of highly reflective targets is noted for the road sign behind the shipping container in the bottom image of FIG. 6D.

Computer System

Figure 7:
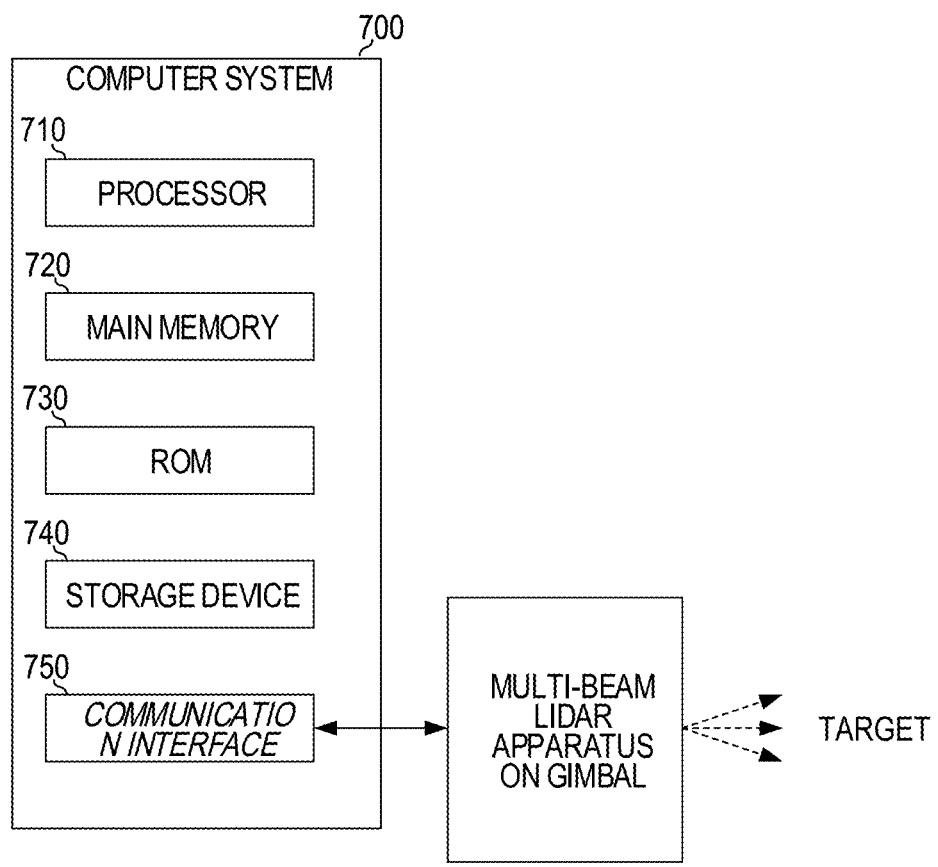
FIG. 7 is a block diagram illustrating a computer system upon which examples described herein may be implemented.

FIG. 7 is a block diagram that illustrates a computer system upon which examples described herein may be implemented. A computer system 700 may be implemented on, for example, a server or combination of servers. For example, the computer system 700 may be implemented as part of a calibration system implementing calibration method 400 of FIG. 4. In the context of FIG. 1, the calibration system may be implemented using a computer system 700 such as described by FIG. 7. The calibration system may also be implemented using a combination of multiple computer systems of the type described by FIG. 7.

In one implementation, the computer system 700 includes processing resources including a processor 710, a main memory 720, a read-only memory (ROM) 730, a storage device 740, and a communication interface 750. The computer system 700 includes at least one processor 710 for processing information stored in the main memory 720, such as provided by a random-access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with the multi-beam lidar apparatus 760 (e.g., Velodyne HDL-64e multi-beam lidar apparatus) mounted on a gimbal as described herein. Using a network link, the computer system 700 may communicate with the multi-beam lidar apparatus 760 as well as one or more computing devices and one or more servers. In accordance with some examples, the computer system 700 receives the multi-beam lidar scan data for processing as described herein.

By way of example, the instructions and data stored in the memory 720 may be executed by the processor 710 to implement the calibration method of FIG. 4. In performing the operations, the processor 710 may handle receiving and storing multi-beam lidar data from multi-beam lidar apparatus 760 and performing the calibration calculations described above. The processor 710 executes instructions for the software and/or other logic to perform one or more processes, steps, and other functions described with implementations such as those described by FIG. 1 through FIG. 6.

Examples described herein are related to the use of the computer system 700 for implementing the techniques described. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of, or in combination with, software instructions to implement examples described herein. Thus, the examples described are not limited to any specific combination of hardware circuitry and software.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

It is contemplated for examples described herein to extend to individual elements and concepts described, independently of other concepts, ideas, or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example may be combined with other individually described features, or parts of other examples, even if the other features and examples make no mention of the particular feature. Thus, the absence of describing combinations should not preclude claiming rights to such combinations.

Executable Instructions and Machine-Storage Medium

The various memories (i.e., 720, 730, and/or memory of the processor unit(s) 710) and/or storage device 740 may store one or more sets of instructions and data structures (e.g., instructions) embodying or utilized by any one or more of the methodologies or functions described herein. These instructions, when executed by processor unit(s) 710 cause various operations to implement the disclosed examples.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 740 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions may further be transmitted or received over a communications network using a transmission medium via the network interface device 750 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

EXAMPLES

In addition to the claimed systems and methods, the examples further include:

Example 1 is a computer-implemented method of calibrating multi-beam lidar intensity, comprising directing multi-beam lidar at a target comprising at least two panels of different reflectance standards covering a desired calibration range and measuring intensity response curves of reflectance data for each beam of the multi-beam lidar reflected by the two or more panels; evaluating the intensity response curves of the reflectance data for each beam of the multi-beam lidar to compute a learned reflectance value from an intensity response of each beam and an associated confidence defined as a measure of a probability that a range and raw intensity pair is generated from a surface with reflectance equal to the learned reflectance value; and from the computed learned reflectance value and associated confidence, determining continuous reflectance for each beam.

Example 2 is a method as in Example 1, further comprising characterizing the intensity response of each beam to determine at least one of the following aspects of each beam's intensity response: a dynamic range of the beam, a feasible power and reflectance combination, a focal distance estimation of the lidar, and an ideal placement of a B-spline curve or other parametric form to capture an intensity response curve.

Example 3 is a method as in any preceding example, wherein the intensity response of reflectance data is measured for valid lidar returns from the target, where valid lidar returns are valid if a raw intensity return is within the dynamic range of the beam and the lidar return's range is within predetermined distances measured from the target.

Example 4 is a method as in any preceding example, further comprising reporting the determined continuous reflectance along with a measure of uncertainty, where the uncertainty is computed using confidence values from curve fitting in combination with a sharpness of a sub-reflectance parabola peak.

Example 5 is a method as in any preceding example, further comprising computing for each panel of the target a curve reflectance response and a confidence as a function of range and measured raw intensity of lidar reflected by each panel, where the curve reflectance response is a learned reflectance value during calibration and the confidence is a measure of a probability that the range and measured raw intensity of lidar reflected by each panel is generated from a surface with a reflectance equal to the curve reflectance response.

Example 6 is a method as in any preceding example, wherein determining the continuous reflectance for each beam comprises fitting a parabola to the learned reflectance value in a vicinity of a value with a highest probability.

Example 7 is a method as in any preceding example, wherein the intensity response curves of reflectance data for each beam of the multi-beam lidar reflected by the two or more panels at power (p) takes the form:

$$f_p(i, r) = \frac{c}{r} \exp\left(-\frac{\|\log i - l\|^2}{\sigma}\right),$$

where:
i is a raw lidar intensity at given power p;
r is a range to the target, and
c, l, and σ are parameters of a log-normal power law to be estimated.

Example 8 is a method as in any preceding example, further comprising determining a calibrated intensity as a reflectance associated with a parametric form that minimizes a deviation between the intensity response curves of the reflectance data for each beam of the multi-beam lidar and raw lidar intensity measurements where for every intensity response curve given a ground truth reflectance ρ, a cost curve C is given by:

$$C_p(\rho; i, r) = |f_p^\rho(r) - i|,$$

Example 9 is a method as in any preceding example, further comprising calculating calibrated intensity ρ*, which is an intensity associated with a lowest cost of the cost curve C, namely:

$$\rho^* = \underset{\rho}{\operatorname{argmin}}\, C_p(\rho; i, r).$$

Example 10 is a method as in any preceding example, further comprising determining a final calibrated intensity value as a minima of a quadratic fit using a cost in a vicinity of an optimal value of a cost curve C.

Example 11 is a method as in any preceding example, further comprising calculating a measure of uncertainty of the final calibrated intensity value as a ratio between a second-best cost and a best cost of the cost curve C.

Example 12 is a lidar data collection apparatus comprising: a lidar calibration target comprising at least two calibration panels having known reflectance values organized in a grid; a linear rail on which the lidar calibration target is mounted; and a nodding platform on which a lidar apparatus is mounted, the nodding platform configured to ensure that measurements may be taken for every lidar beam from the lidar apparatus to each of the at least two calibration panels.

Example 13 is a lidar data collection apparatus as in Example 12, further comprising processing means comprising a processor and a memory that stores instructions that when executed by the processor cause the processor to perform operations comprising optimizing a nodding angle range and scanning time of the lidar calibration target as a function of a distance of the lidar calibration target to the lidar apparatus.

Example 14 is a lidar data collection apparatus as in Examples 12 or 13, wherein the processor further executes instructions that when executed by the processor cause the processor to perform operations comprising obtaining an optimum reflectance of the lidar calibration target by interpolating a parabola parameterized by reflectance in a vicinity of a minimum reflectance value.

Example 15 is a lidar data collection apparatus as in Examples 12-14, further comprising processing means for calibrating multi-beam lidar intensity output by the lidar apparatus, the processing means comprising a processor and a memory that stores instructions that when executed by the processor cause the processor to perform operations comprising: directing multi-beam lidar from the lidar apparatus at the lidar calibration target; measuring intensity response curves of reflectance data for each beam of the multi-beam lidar reflected by the two or more panels of the lidar calibration target; evaluating the intensity response curves of the reflectance data for each beam of the multi-beam lidar to compute a learned reflectance value from an intensity response of each beam; generating a confidence value associated with the reflectance data for each beam of the multi-beam lidar, where the confidence value is defined as a measure of a probability that a range and raw intensity pair is generated from a surface with reflectance equal to the learned reflectance value; and from the computed learned reflectance value and associated confidence, determining continuous reflectance for each beam of the multi-beam.

Example 16 is a lidar data collection apparatus as in Examples 12-15, wherein the processor further executes instructions that when executed by the processor cause the processor to perform operations comprising computing for each panel of the lidar calibration target a curve reflectance response and the confidence value as a function of range and measured raw intensity of lidar reflected by each panel, where the curve reflectance response is a learned reflectance value during calibration and the confidence value is a measure of a probability that the range and measured raw intensity of lidar reflected by each panel is generated from a surface with a reflectance equal to the curve reflectance response.

Example 17 is a lidar data collection apparatus as in Examples 12-16, wherein the processor further executes instructions that when executed by the processor cause the processor to perform operations comprising computing from an expected curve reflectance response and an associated confidence value a return reflectance by fitting a parabola to a curve reflectance response in a vicinity of a value of the curved reflectance response with a highest probability.

Example 18 is a method for collecting lidar data comprising: mounting a lidar calibration target comprising at least two calibration panels having known reflectance values organized in a grid on a linear rail; mounting a lidar apparatus on a nodding platform configured to ensure that measurements may be taken for every, lidar beam from the lidar apparatus to each of the at least two calibration panels;

moving the lidar calibration target along the linear rail at a distance from a first distance to a predetermined distance in predetermined distance increments; at each distance increment, computing an optimal nodding range of a unit of the nodding platform; and at each distance increment, obtaining a plurality of sample measurements per calibration panel of the lidar calibration target as function of distance between the lidar calibration target and the lidar apparatus.

Example 19 is a method for collecting lidar data as in Example 18, wherein the lidar apparatus is mounted on a gimbal, further comprising determining a set of optimal gimbal angles of the gimbal for a known beam orientation for all lidar beams of the lidar apparatus and a known range of motion of the gimbal whereby each lidar beam of the lidar apparatus may scan all calibration panels of the lidar calibration target.

Example 20 is a method for collecting lidar data as in Examples 18 or 19, further comprising waiting at each scanning position for a wait period proportional to a distance the lidar calibration target is from the lidar apparatus before moving to a new scanning position, whereby the wait period increases as a function of the distance the lidar calibration target is from the lidar apparatus.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure, for example, to comply with 37 CFR, § 1.72(b) in the United States of America. It is submitted with the understanding that it will not be used to interpret or limit the scope or meaning of the claims.

Also, in the above Detailed Description, various features may be grouped together to streamline the disclosure. However, the claims cannot set forth every feature disclosed herein, as examples may feature a subset of such features. Further, examples may include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computer-implemented method of calibrating multi-beam lidar intensity, comprising:
    directing multi-beam lidar at a target comprising at least two panels of different reflectance standards covering a calibration range and measuring intensity response curves of reflectance data for each beam of the multi-beam lidar reflected by the at least two panels;
    evaluating the intensity response curves of the reflectance data for each beam of the multi-beam lidar to compute a learned reflectance value from an intensity response of each beam and an associated confidence defined as a measure of a probability that a range and raw intensity pair is generated from a surface with reflectance equal to the learned reflectance value; and
    from the computed learned reflectance value and associated confidence, determining continuous reflectance for each beam.

2. The method of claim 1, further comprising characterizing the intensity response of each beam to determine at least one of: a dynamic range of the beam, a feasible power and reflectance combination, a focal distance estimation of the lidar, or an ideal placement of a parametric form to capture an intensity response curve.

3. The method of claim 1, wherein the intensity response of reflectance data is measured for valid lidar returns from the target, where valid lidar returns are valid if a raw intensity return is within a dynamic range of the beam and the lidar return's range is within predetermined distances measured from the target.

4. The method of claim 1, further comprising reporting the determined continuous reflectance along with a measure of uncertainty, where the uncertainty is computed using confidence values from curve fitting in combination with a sharpness of a sub-reflectance parabola peak.

5. The method of claim 1, further comprising computing for each panel of the target a curve reflectance response and a confidence as a function of range and measured raw intensity of lidar reflected by each panel, where the curve reflectance response is a learned reflectance value during calibration and the confidence is a measure of a probability that the range and measured raw intensity of lidar reflected by each panel is generated from a surface with a reflectance equal to the curve reflectance response.

6. The method of claim 1, wherein determining the continuous reflectance for each beam comprises fitting a parabola to the learned reflectance value in a vicinity of a value with a highest probability.

7. The method of claim 1, wherein the intensity response curves of reflectance data for each beam of the multi-beam lidar reflected by the at least two panels at power (p) takes the form:

$$f_p(i, r) = \frac{c}{r} \exp\left(-\frac{\|\log i - l\|^2}{\sigma}\right),$$

where:
    i is a raw lidar intensity at given power p;
    r is a distance to the target, and
    c, l, and σ are parameters of a log-normal power law to be estimated.

8. The method of claim 7, further comprising determining a calibrated intensity as a reflectance associated with a parametric form that minimizes a deviation between the intensity response curves of the reflectance data for each beam of the multi-beam lidar and raw lidar intensity measurements where for every intensity response curve given a ground truth reflectance ρ, a cost curve C is given by:

$$C_p(\rho; i, r) = |f_p^\rho(r) - i|.$$

9. The method of claim 8, further comprising calculating calibrated intensity ρ*, which is an intensity associated with a lowest cost of the cost curve C, namely:

$$p^* = \underset{\rho}{\mathrm{argmin}}\ C_p(\rho; i, r).$$

10. The method of claim 9, further comprising determining a final calibrated intensity value as a minima of a quadratic fit using a cost in a vicinity of an optimal value of a cost curve C.

11. The method of claim 10, further comprising calculating a measure of uncertainty of the final calibrated intensity value as a ratio between a second-best cost and a best cost of the cost curve C.

12. A lidar system, comprising:
  a target comprising at least two panels of different reflectance standards covering a calibration range;
  a lidar device configured to direct multi-beam lidar at the target; and
  a hardware processor programmed to perform operations comprising:
    evaluating intensity response curves of reflectance data measured by the lidar device for each beam of the multi-beam lidar to compute a learned reflectance value from an intensity response of each beam and an associated confidence defined as a measure of a probability that a range and raw intensity pair is generated from a surface with reflectance equal to the learned reflectance value; and
    from the computed learned reflectance value and associated confidence, determining continuous reflectance for each beam.

13. The lidar system of claim 12, the operations further comprising characterizing the intensity response of each beam to determine at least one of: a dynamic range of the beam, a feasible power and reflectance combination, a focal distance estimation of the lidar, or an ideal placement of a parametric form to capture an intensity response curve.

14. The lidar system of claim 12, wherein the intensity response of reflectance data is measured for valid lidar returns from the target, where valid lidar returns are valid if a raw intensity return is within a dynamic range of the beam and the lidar return's range is within predetermined distances measured from the target.

15. The lidar system of claim 12, the operations further comprising reporting the determined continuous reflectance along with a measure of uncertainty, where the uncertainty is computed using confidence values from curve fitting in combination with a sharpness of a sub-reflectance parabola peak.

16. lidar system of claim 12, the operations further comprising computing for each panel of the target a curve reflectance response and a confidence as a function of range and measured raw intensity of lidar reflected by each panel, where the curve reflectance response is a learned reflectance value during calibration and the confidence is a measure of a probability that the range and measured raw intensity of lidar reflected by each panel is generated from a surface with a reflectance equal to the curve reflectance response.

17. The lidar system of claim 12, wherein determining the continuous reflectance for each beam comprises fitting a parabola to the learned reflectance value in a vicinity of a value with a highest probability.

18. The lidar system of claim 12, wherein the intensity response curves of reflectance data for each beam of the multi-beam lidar reflected by the at least two panels at power (p) takes the form:

$$f_p(i, r) = \frac{c}{r}\exp\left(-\frac{\|\log i - l\|^2}{\sigma}\right),$$

where:
  i is a raw lidar intensity at given power p;
  r is a range to the target, and
  c, l, and σ are parameters of a log-normal power law to be estimated.

19. The lidar system of claim 18, the operations further comprising determining a calibrated intensity as a reflectance associated with a parametric form that minimizes a deviation between the intensity response curves of the reflectance data for each beam of the multi-beam lidar and raw lidar intensity measurements where for every intensity response curve given a ground truth reflectance ρ, a cost curve C is given by:

$$C_p(p, i, r) = |f_p^p(r) - i|,$$

* * * * *